(12) United States Patent
Kataoka et al.

(10) Patent No.: US 7,716,604 B2
(45) Date of Patent: May 11, 2010

(54) APPARATUS WITH THUMBNAIL DISPLAY

(75) Inventors: Takashi Kataoka, Fujisawa (JP); Takashi Yoshimaru, Kokubunji (JP); Takaaki Ishii, Kawasaki (JP); Yasuhisa Mori, Hitachi (JP); Norikazu Sasaki, Ebina (JP)

(73) Assignee: Hitachi, Ltd., Tokyo (JP)

( * ) Notice: Subject to any disclaimer, the term of this patent is extended or adjusted under 35 U.S.C. 154(b) by 605 days.

(21) Appl. No.: 11/367,388

(22) Filed: Mar. 6, 2006

(65) Prior Publication Data
US 2006/0236251 A1  Oct. 19, 2006

(30) Foreign Application Priority Data
Apr. 19, 2005  (JP)  ............................. 2005-121418

(51) Int. Cl.
G06F 3/048 (2006.01)

(52) U.S. Cl. ........................ 715/835; 715/757; 715/764; 715/766; 715/838

(58) Field of Classification Search ................. 715/757, 715/838, 764, 766, 835
See application file for complete search history.

(56) References Cited

U.S. PATENT DOCUMENTS

| | | | | |
|---|---|---|---|---|
| 4,920,504 | A * | 4/1990 | Sawada et al. | 345/573 |
| 5,353,391 | A * | 10/1994 | Cohen et al. | 345/619 |
| 5,623,613 | A * | 4/1997 | Rowe et al. | 715/841 |
| 6,006,227 | A * | 12/1999 | Freeman et al. | 707/7 |
| 6,012,072 | A * | 1/2000 | Lucas et al. | 715/210 |
| 6,253,218 | B1 * | 6/2001 | Aoki et al. | 715/201 |
| 6,301,586 | B1 * | 10/2001 | Yang et al. | 707/104.1 |
| 6,621,509 | B1 * | 9/2003 | Eiref et al. | 715/836 |
| 6,754,906 | B1 * | 6/2004 | Finseth et al. | 725/45 |
| 6,910,191 | B2 * | 6/2005 | Segerberg et al. | 715/830 |
| 7,010,752 | B2 * | 3/2006 | Ly | 715/769 |
| 7,072,450 | B1 * | 7/2006 | Pinard | 379/88.11 |
| 7,146,576 | B2 * | 12/2006 | Chang et al. | 715/848 |
| 7,336,279 | B1 * | 2/2008 | Takiguchi | 345/473 |
| 2003/0061132 | A1 * | 3/2003 | Yu et al. | 705/30 |
| 2005/0154988 | A1 * | 7/2005 | Proehl et al. | 715/720 |
| 2005/0278298 | A1 * | 12/2005 | Slenkovich | 707/1 |
| 2006/0090141 | A1 * | 4/2006 | Loui et al. | 715/764 |
| 2007/0130515 | A1 * | 6/2007 | Maas | 715/526 |

FOREIGN PATENT DOCUMENTS

| | | |
|---|---|---|
| JP | 10-187743 | 7/1998 |
| JP | 2004-221672 | 8/2004 |

* cited by examiner

Primary Examiner—William L Bashore
Assistant Examiner—Gregory A Distefano
(74) Attorney, Agent, or Firm—Antonelli, Terry, Stout & Kraus, LLP.

(57) ABSTRACT

In a thumbnail screen, categories and category thumbnails are disposed and displayed in the depth (Z-axis) direction and in the horizontal (X axis) direction, respectively. When focus is given by a focus to any of upper and lower category thumbnails, which are displayed on the most front side, and a category name display part, the row (layers) of the thumbnails scrolls in the horizontal direction. When the right and left direction keys of a remote controller are operated while the category name display has focus, the scroll in the depth direction is performed, thus enabling the specification of a desired category. This three-dimensionally displays the thumbnails and facilitates the operation for viewing information.

18 Claims, 14 Drawing Sheets

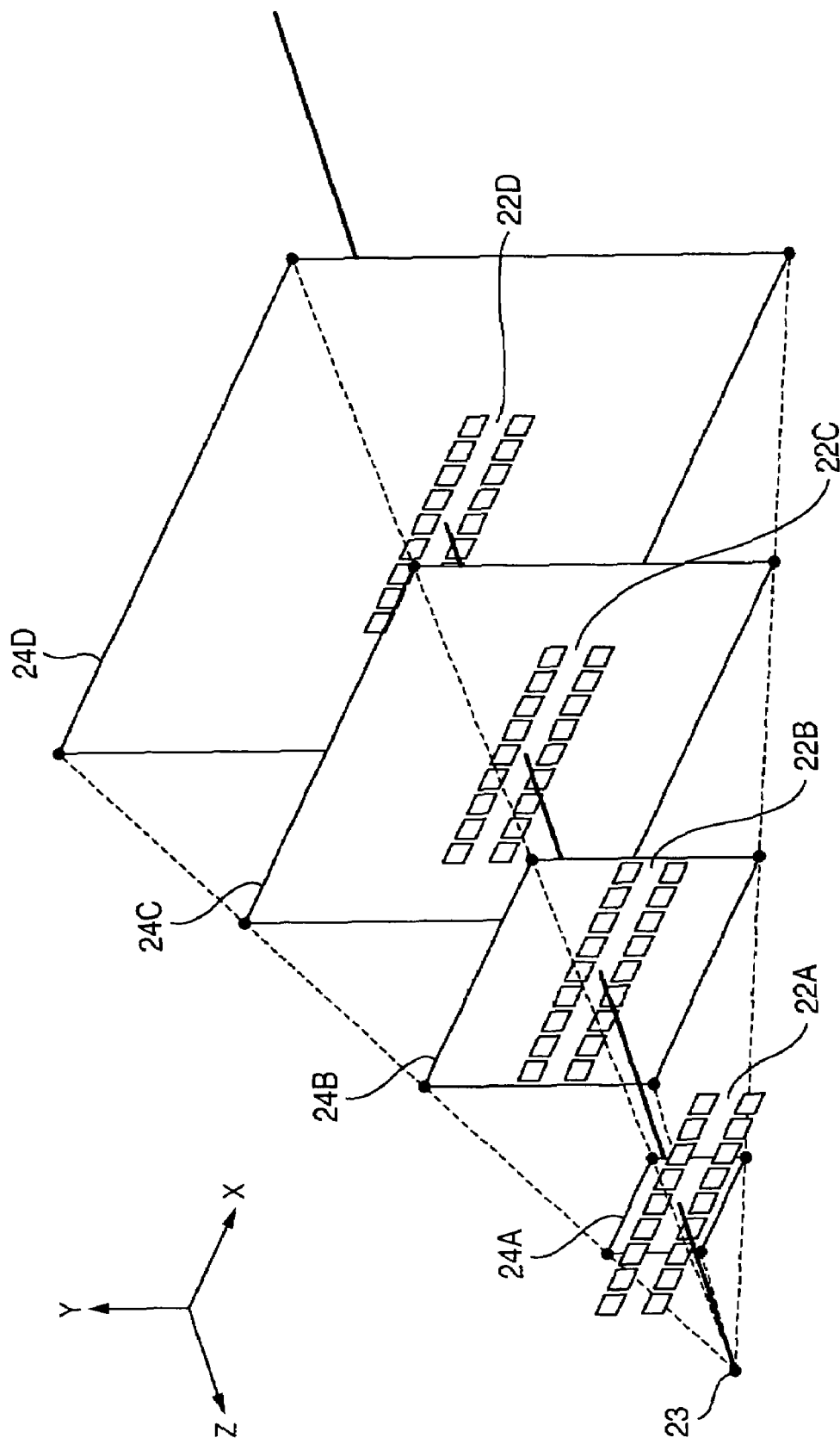

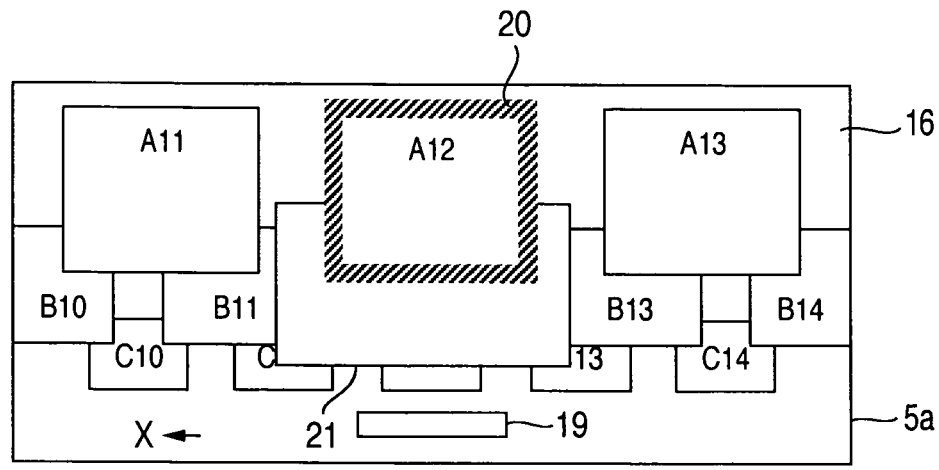
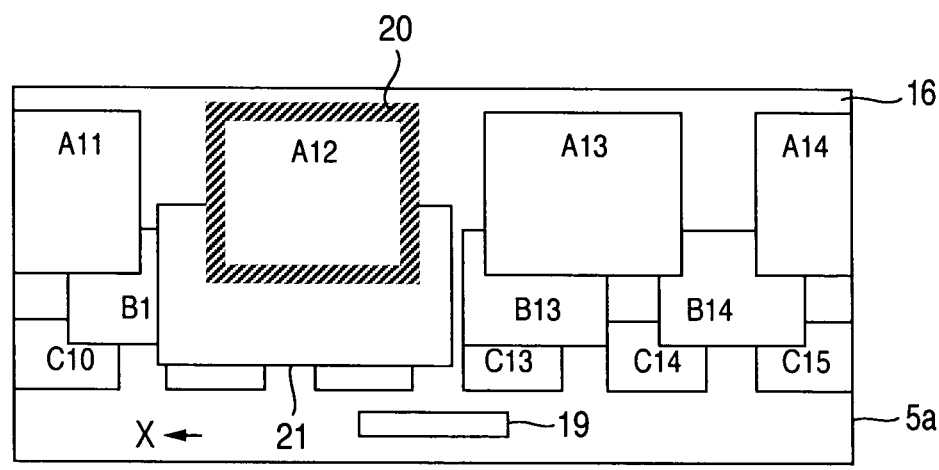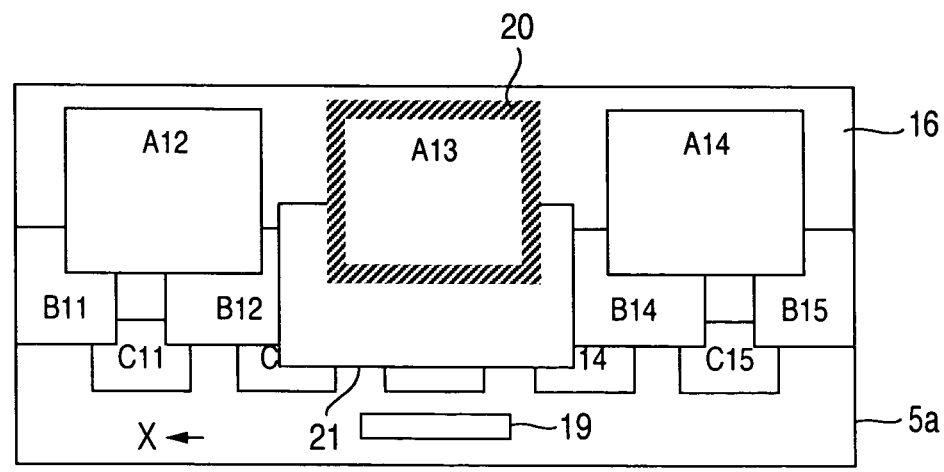

APPARATUS WITH THUMBNAIL DISPLAY

INCORPORATION BY REFERENCE

The present application claims priority from Japanese application JP2005-121418 filed on Apr. 19, 2005, the content of which is hereby incorporated by reference into this application.

BACKGROUND OF THE INVENTION

Conventionally, in an apparatus with thumbnail display, in order to enable selectively viewing the contents (information) of various categories, such as, for example, television programs, pictures, video-recorded information, still frames or the like, thumbnails, which are reduced specific images, have been created for each content of those categories, and simultaneously displayed on the screen as a content menu screen (i.e. thumbnail screen). Therefore, in the apparatus with thumbnail display, it has been able to display and view the desired content on the screen by selecting the thumbnail of the desired content from the thumbnail screen.

In an exemplary apparatus with thumbnail display, the display screen is divided into sections for a TV program, a library, and the Internet starting from the top. In the TV program section, thumbnails for TV channels are arranged and displayed. In the library section, thumbnails for files for each content stored in folders registered in the library of a hard disc (e.g. video-recorded program file, moving image video file, still image file, voice file, Internet data file or the like) are arranged and displayed. In the Internet section, thumbnails for Internet data introduction information are arranged and displayed. (Reference may be made to JP-A-2004-221672 for example.

In this apparatus with thumbnail display, since each thumbnail is displayed with a space between each, it is possible to clearly identify the thumbnail. Furthermore, the thumbnails arranged in these TV program, library, and Internet sections always scroll on the display screen from right to left. Therefore, even if there are too many thumbnails to be displayed on one screen, they are sequentially and repeatedly displayed on the screen. Thus, it is possible to select a desired thumbnail from among the displayed thumbnails by pointing and clicking it with a cursor, and then to view the content of the selected thumbnail.

In such a thumbnail screen, the library section is also divided into each file, such as a video-recorded program file, a moving image file, or the like, mentioned above. Therefore, it should be noted that the type of each content, such as each file in the TV program and library, Internet data introduction information, or the like, is referred to as a category in the following sections.

A data display method of the apparatus with thumbnail display has been proposed as another example. In the data display method, thumbnails for respective categories are arranged in an XYZ coordinate space, and the thumbnails are visible from various viewpoints, thus making it possible to select the thumbnail of a desired content. Reference may be made to JP-A-10-187743 for example.

In this data display method, the Z-axis in the depth direction is configured to be a coordinate axis for indicating date and time, and along the Z-axis a calendar model for indicating date and time is displayed. The X axis, parallel to the display screen and in the horizontal direction, is configured to be a coordinate axis for indicating the type of categories, and a category model for indicating the name of categories, such as "document", "image" or "planning conference", is arranged and displayed in the X direction. Moreover, for each category model, thumbnails belonging to the category are arranged in the Z-axis direction.

The thumbnails, which are arranged in a three dimensional (3D) space, are visible from a different viewpoint in accordance with instructions to change the viewpoint given by an input unit. When the viewpoint is brought closer to a thumbnail, the display of thumbnail is enlarged accordingly. When a desired thumbnail is specified and clicked, the thumbnail is selected, with its content being displayed.

SUMMARY OF THE INVENTION

In the foregoing invention described in JP-A-2004-221672, since thumbnails for each content are scroll-displayed from right to left, it is possible to introduce a lot of contents. However, in order to select a desired content, it is necessary to specify and click a thumbnail of a desired content with a cursor from the thumbnail screen that is scrolling as above, or from a flow of a number of thumbnails. It is difficult to select the desired thumbnail from among the moving numerous thumbnails.

Furthermore, since the thumbnails are provided for each category on the thumbnail screen, it may be possible to select the thumbnail of the desired content easily and without fail by fixing a cursor at a position where the thumbnail of the category desired to be searched flows, and then by clicking when the thumbnail of the desired content flows to overlie the cursor. However, it takes a certain amount of time to select a desired thumbnail with this manner.

Besides, since all categories are simultaneously displayed, the size of the thumbnails that are simultaneously displayed decreases with an increase in the number of categories, thus making it less easy to determine the contents.

On the other hand, in the data display method described in the above JP-A-10-187743 as well, thumbnails of contents are also provided for each category and displayed, and the arrangement of the thumbnails can be seen from various directions, as is the case with the above. Therefore, it may be possible to search the thumbnail of the desired content by viewing thumbnails from an easy-to-view direction.

However, in the data display method described in the above JP-A-10-187743 as well, since all categories are simultaneously displayed, as is the case with the apparatus with thumbnail display described in JP-A-2004-221672, each thumbnail is displayed in a small size, thus making it difficult to view the displayed content. Therefore, it becomes more difficult to find out the thumbnail of the desired content. Here, although it may be possible to identify the displayed content of the thumbnail without difficulty by bringing a viewpoint closer to the thumbnail, an operation for that purpose (i.e. an input operation for instructing a change in the viewpoint) is needed. Unless the viewpoint is changed, the display state of the thumbnail screen is held unchanged.

In addition, also in the data display method described in the JP-A-10-187743, an operation for giving instructions with cursor is needed in order to select the thumbnail of the desired content. The operation includes many kinds, such as operations for instructing to change the viewpoint, specifying a thumbnail, and selecting a thumbnail (clicking), thus posing an problem with respect to operations.

It is an object of the present invention to provide an apparatus with thumbnail display configured to be able to solve such problems and to select a desired thumbnail on a 3D display thumbnail screen easily, rapidly, and reliably.

In order to achieve the above object, according to one aspect of the present invention a thumbnail screen is provided on which layers for respective categories for indicating the type of categories are disposed in the Z-axis direction, or in the depth direction, thumbnails are disposed in the X-axis direction, or in the horizontal direction, for each layer, and a category name display part is provided that represents the name of the highest rank layer category which is disposed on the most front side or the nearest side in the Z-axis direction.

In order to accomplish the object, according to another aspect of the present invention, an apparatus with thumbnail display comprises: a display means for displaying a thumbnail screen in which layers for respective categories for indicating the kind of category are disposed in the Z-axis direction, or in the depth direction, thumbnails are disposed in the X-axis direction, or in the horizontal direction, for each layer, and a category name display part for displaying category names is included; a first operation means for selectively giving focus to any one of the thumbnail located on a given position of a layer of the highest rank layer category and the category name display part; a second operation means for scrolling the layers disposed in the Z-axis direction in the Z-axis direction; a third operation means for scrolling the thumbnails disposed on the layer in the X-axis direction in the X-axis direction; and a fourth operation means for displaying the content corresponding to the focused thumbnail on the display screen, wherein a category can be selected by the Z-axis direction scroll, and a desired thumbnail of the selected category can be selected by the X-axis direction scroll.

Additionally, the apparatus with thumbnail display according to the present invention has a means for causing the disposed layers to scroll in the Z-axis direction and for causing the thumbnails disposed on the layer to scroll in the X-axis direction alternately at a predetermined cycle when neither the scroll in X-axis direction nor the scroll in Z-axis direction is performed by the second and third means after a lapse of a predetermined time.

Preferably, the second operation means may be configured to enable the scroll of the disposed layers to be scrolled in the Z-axis direction when the category name display part is given a focuse.

Preferably, the category name display part may be configured to display the name of the highest rank layer category. Therefore, when the highest rank layer category changes due to the scroll of the layers in the Z-axis direction, the name displayed on the category name display part also changes to that of the category that has newly become the highest rank layer.

Preferably, the third operation means may be configured to enable the scroll in the X-axis direction of the thumbnails on at least the highest rank category layer when a thumbnail on the highest rank category layer has focus.

Preferably, each category layer is endlessly arranged such that the layers can be repeatedly and sequentially displayed during the scroll in the Z-axis direction, and the thumbnails on each layer are endlessly arranged such that they can be repeatedly and sequentially displayed during the scroll in the X-axis direction.

Preferably, the thumbnail, which is put out of the thumbnail screen during the scrolls in the X-axis direction and Z-axis direction, is put out while fading out, while the thumbnail, which newly emerges on the thumbnail screen, emerges while fading in.

Preferably, the categories include an "on-the-air program" category regarding a TV program currently on the air and the content being received is displayed in stead of a thumbnail on the thumbnail display region of the "on-the-air program" where focus is given.

Preferably, the categories include an "on-the-air program" category regarding a TV program currently on the air or being received and the content of the thumbnail of the "on-the-air program" category changes at each point in time of a predetermined interval to the content received at that time in point.

Preferably, the apparatus with thumbnail display is configured such that categories can be added or deleted.

Preferably, the apparatus with thumbnail display has a fifth means for changing an arbitrary layer to the highest category layer by selecting that layer from the row of each category layer disposed in the Z-axis direction.

Preferably, the fifth means is configured to select a region other than the layers on the thumbnail screen to scroll the row of layers in the Z-axis direction.

According to the embodiments of the present invention, a plurality of thumbnails of the same category are simultaneously displayed on the screen, thus making it easy to identify and search contents.

Moreover, according to the present invention, it is possible to easily scroll each row of category layers in the Z-axis direction with a 3D display of thumbnails. It is also possible to easily scroll the row of thumbnails of the same category in the X-axis direction, thus making it possible to identify each category thumbnail and to search a desired content with a small number of operation keys. Additionally, easy operations are facilitated and erroneous operations are prevented.

Further, since the category name display part is displayed that displays the name of the category whose layer is disposed on the most front side in the Z-axis direction, it is possible to identify the category which is scrolled in the Z-axis direction without fail while disposing the row of each category layer in the Z-axis direction.

Other objects, features and advantages of the invention will become apparent from the following description of the embodiments of the invention taken in conjunction with the accompanying drawings.

BRIEF DESCRIPTION OF THE DRAWINGS

FIG. 7 is a diagram explaining a display pattern on the display screen of the thumbnail screen;

FIGS. 9A, 9B, and 9C are diagrams showing the scroll of the thumbnail screen in the X-axis direction;

DESCRIPTION OF THE EMBODIMENTS

Embodiments according to the present invention will be described in the following sections with reference to the appended drawings.

Figure 1:
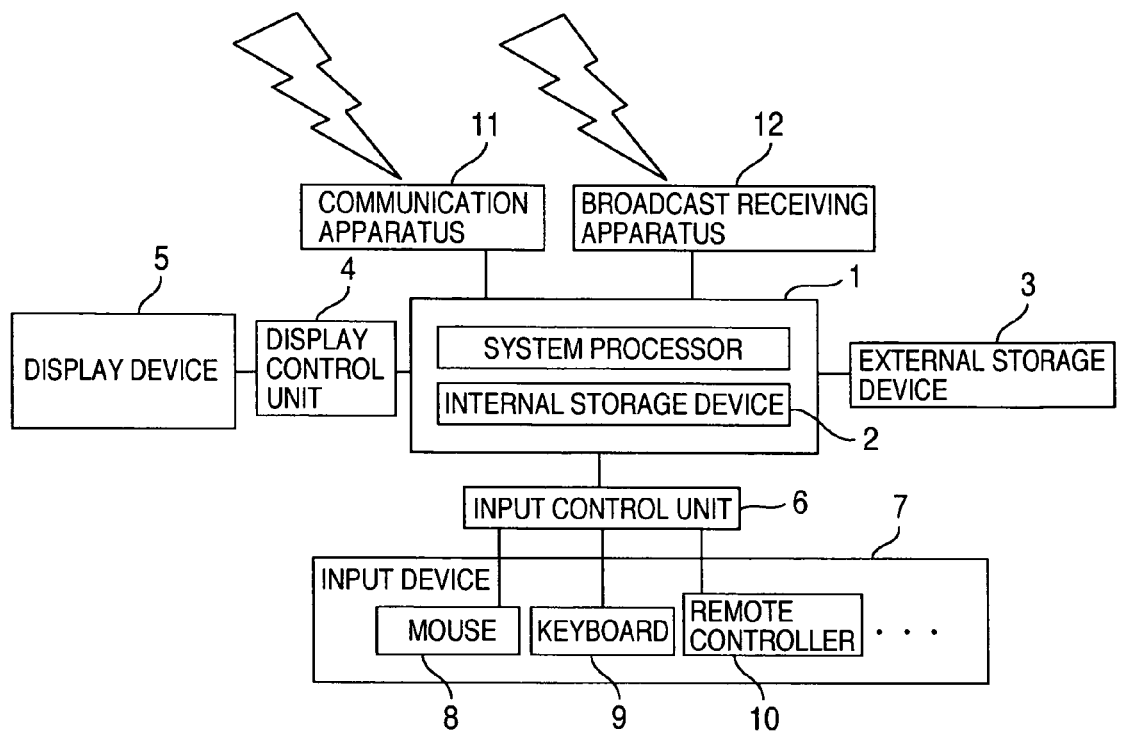
FIG. 1 is a block diagram showing an embodiment of an apparatus with thumbnail display according to the present invention.

FIG. 1 a block diagram showing an embodiment of the apparatus with thumbnail display according to the present invention, wherein 1 is a system processor, 2 is an internal storage, 3 is an external storage, 4 is a display control device, 5 is a display device, 6 is an input control unit, 7 is an input device, 8 is a mouse, 9 is a keyboard, 10 is a remote controller, 11 is a communication apparatus, and 12 is a broadcast receiving apparatus.

In FIG. 1, the apparatus with thumbnail display of this embodiment is, for example, a personal computer provided with functions to receive TV programs, to capture data from disks, such as a CD (Compact Disk), a DVD (Digital Versatile Disc) or the like, to capture data from a portable camera, or the like. In the apparatus with thumbnail display, a command signal generated through the operation of an input device 7, which includes the keyboard 9, mouse 8, and remote controller 10, is inputted from the input control unit 6, and then the system processor 1 controls various parts and performs various processing using the internal storage 2.

Data of the TV programs and voice programs are received by the broadcast receiving apparatus 12 and displayed by the display device 5 under the control of the display control device 4. A TV program that is set to be recorded by reservation in advance is also received by the broadcast receiving apparatus 12 at a preselected date and time, and stored in the external storage 3 as a file. Moreover, program information received through EPG is also stored in the external storage 3 as a file.

The communication apparatus 11 communicates with other equipment, such as a portable camera (video camera or digital still camera), or communicates through the Internet, and is capable of connecting to a disc form medium or a card type medium to read data from them.

Specifically, it is possible to read image data (moving image data or still image data) recorded in a card type memory incorporated in a portable camera by directly connecting the communication apparatus 11 to the portable camera. Furthermore, it is also possible to read image data recorded in the card type memory by taking out the card type memory from the portable camera and attach it to the communication apparatus 11. The read image data is stored in the external storage 3 as one file. Moreover, image data (picture) that is photographed by a camera-equipped cell phone and recorded in a built-in memory can be read by the communication apparatus 11, and is similarly stored in the external storage 3 as one file.

Image data and voice data obtained from a CD or a DVD are also stored in the external storage 3 as a file.

The files stored in the folders are available for accessing to information by registering the folders having the above stored files in a library. In registering the folders in the library, a path name for the folder, and attribute information corresponding to the content of the folder are registered. The content means data itself such as moving data, still image data, picture, voice data or the like. The attribute information comprises information introducing the content, thumbnail, or the like. For example, in the case of a reservation-recorded moving image content of a TV program, thumbnail, channel, broadcasting date and time, information on whether it is watched after recording, and information on promos, performers or the like from the EPG are associated with the content and stored.

The thumbnail in the attribute information is a reduced representative image corresponding to the content, and is displayed in a thumbnail screen as described later.

As for a TV program now on the air or currently being broadcast, a latest image which is captured in correspondence to a channel is temporarily stored as a thumbnail, and the time at the capture as well as EPG information associated with the image is used as attribute information.

It is also possible to register an Internet URL as well as a general file as access targets of the apparatus with thumbnail display accesses by registering a name and address information used for displaying them, and image information, such as a banner or the like.

Moreover, it is possible to register only unread e-mails as access targets of the apparatus with thumbnail display by registering the address of a mail server.

Each file is classified into a category and stored in the library of the external storage device 3. The category represents the type of content, and includes: an "on-the-air program" category into which the contents of an on-the-air TV program and a voice program are classified; an "unwatched program" category into which a program is classified that is not watched after being reservation-recorded; a "video-recorded program" category into which the content of a recorded TV program and the content obtained from a recording medium, such as a DVD or the like, are classified; a "picture and still image" category into which the content of still image data, pictures, or the like, obtained from a portable camera or a camera-equipped cell phone is classified; a "voice" category into which recorded data of a voice program, and the content obtained from obtained from a CD or the like are classified; a "link collection" category into which links to files, such as Internet URL, or the like, are classified; and an "unread e-mail" category into which unread e-mails are classified. The category is not restricted to the above examples. Taking picture data obtained from a camera-equipped cell phone as an example, they may be divided into different albums, and the each album may be classified into different categories.

The folders in the external storage device 3 can be registered in the library for each category, and it is determined whether the files in the folder can be accessed by an extension or an attribute of the file. For the on-the-air TV programs or voice programs that are classified into the "on-the-air program" category, only the attribute information is stored in the library, and category information representing the "on-the-air program" is included in the attribute information.

Figure 2:
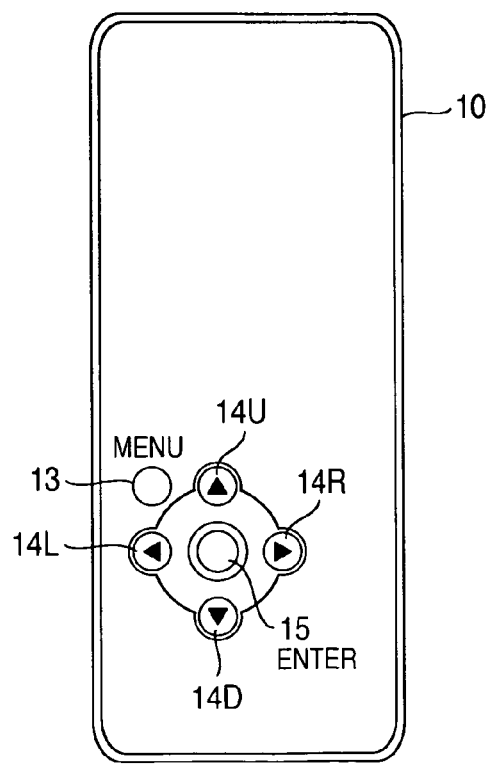
FIG. 2 is a schematic diagram showing an exemplary remote control employed in the apparatus with thumbnail display shown in FIG. 1.

FIG. 2 is a diagram showing a specific example of the operation parts of the remote controller 10 in FIG. 1, wherein 13 is a menu key, 14U is an up direction key, 14D is a down direction key, 14R is a right direction key, 14L is a left direction key, and 15 is a decision key or enter key.

In FIG. 2, the remote controller 10 is provided with operation keys for operating the apparatus with thumbnail display illustrated in FIG. 1 in various ways. Around the decision key 15, direction keys are provided that include the up direction key 14U, down direction key 14D, right direction key 14R, and left direction key 14L. A menu key 13 is also provided. The direction keys 14U, 14D, 14R, 14L and decision key 15 are provided with capabilities for controlling display when the apparatus with thumbnail display is in a mode of searching the files stored in the external storage device 3, as described later.

Here, it should be noted that although other operation keys for operating the apparatus with thumbnail display in various manners are provided in addition to the direction keys 14U, 14D, 14R, 14L and decision key 15, they are omitted in the figures. Those keys are, for example, a power on/off key, a channel selection key (numeric keypad or the like) for TV programs or the like, a volume control key, a record/play key, a menu key or the like. When any one of the operation keys in the remote controller 10 is operated, an instructions corresponding to such operations are transmitted as infrared information to the input control unit 6 shown in FIG. 1. When such infrared information is received, the system processor 1 in the apparatus with thumbnail display operates according to the instructions, controlling various parts and performing a predetermined processing.

When the menu key 13 is operated in the remote controller 10 shown in FIG. 2, a menu screen (not shown) is displayed on the display screen of the display device 5 shown in FIG. 1. From the menu screen, it is possible to select various modes configurable by the apparatus with thumbnail display. The selection of the mode from the menu screen is carried out by operating the direction keys, including 14U, 14D, 14R, 14L, or decision key 15, or by operating the mouse 8. When an information reading mode is selected, for example, a 3D (three dimensional) thumbnail screen is displayed on the display screen of the display device 5. Therefore, it is possible to efficiently search a desired content having excellent visibility from large amounts of contents by simply operating direction keys 14U, 14D, 14R, 14L, or decision key 15 in the remote controller 10.

To simplify the explanation, in the first place, an information reading mode in an embodiment of the apparatus with thumbnail display will be described without considering the scroll of the thumbnail.

Figure 3:
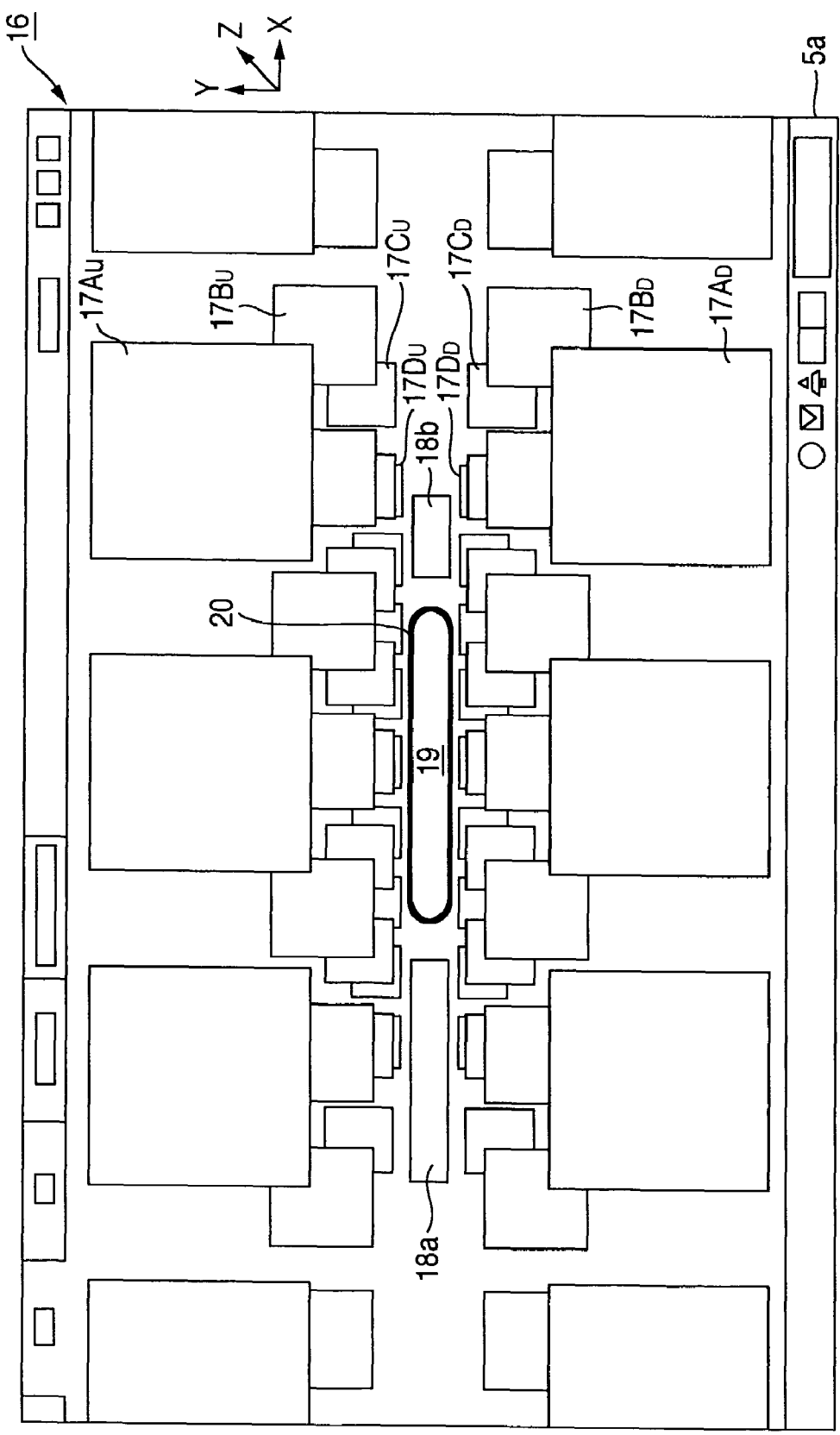
FIG. 3 is a diagram showing a display state of an exemplary thumbnail screen displayed on a display screen of a display unit in FIG. 1.
Figure 4:
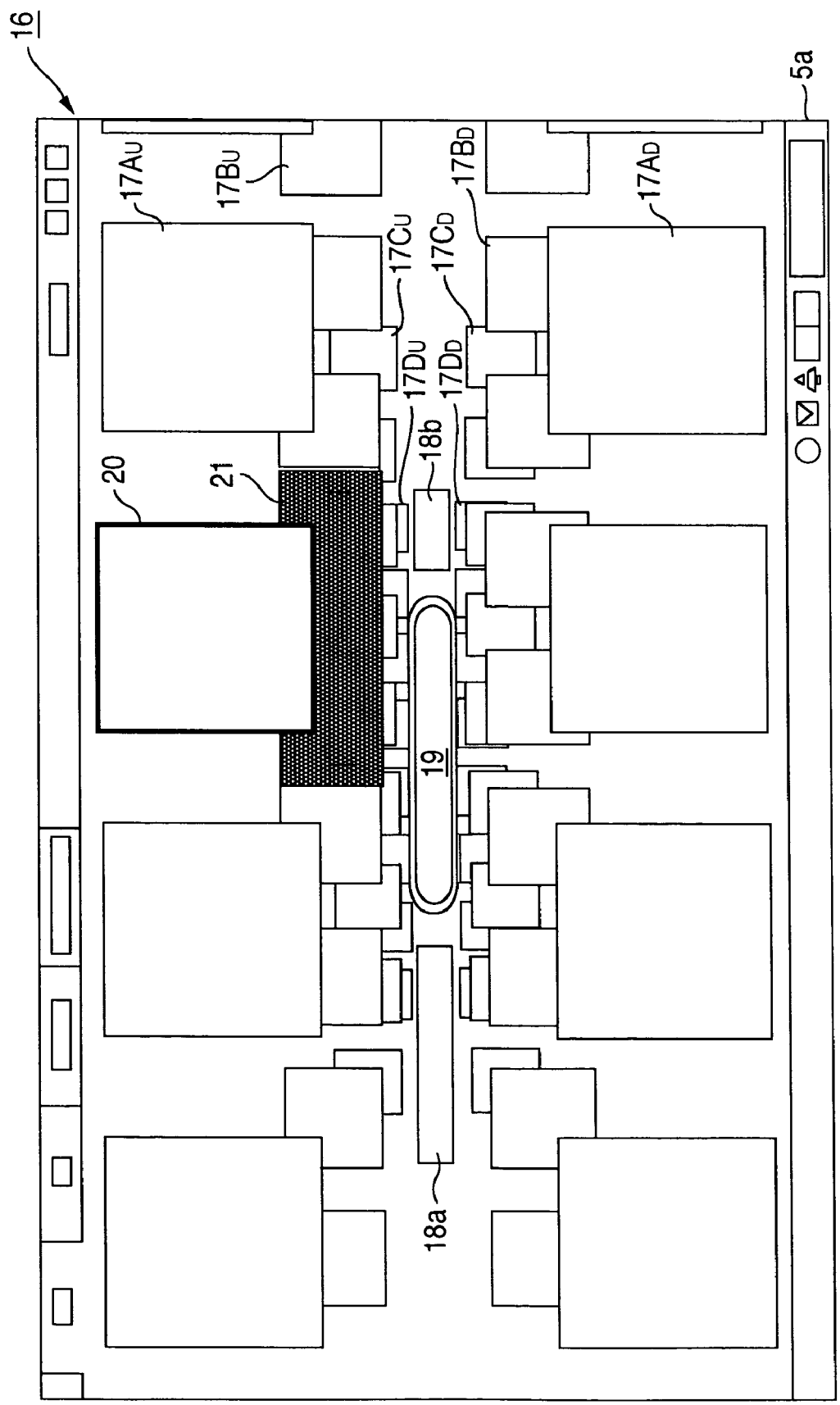
FIG. 4 is a diagram showing another display state different from the thumbnail screen shown FIG. 3.
Figure 5:
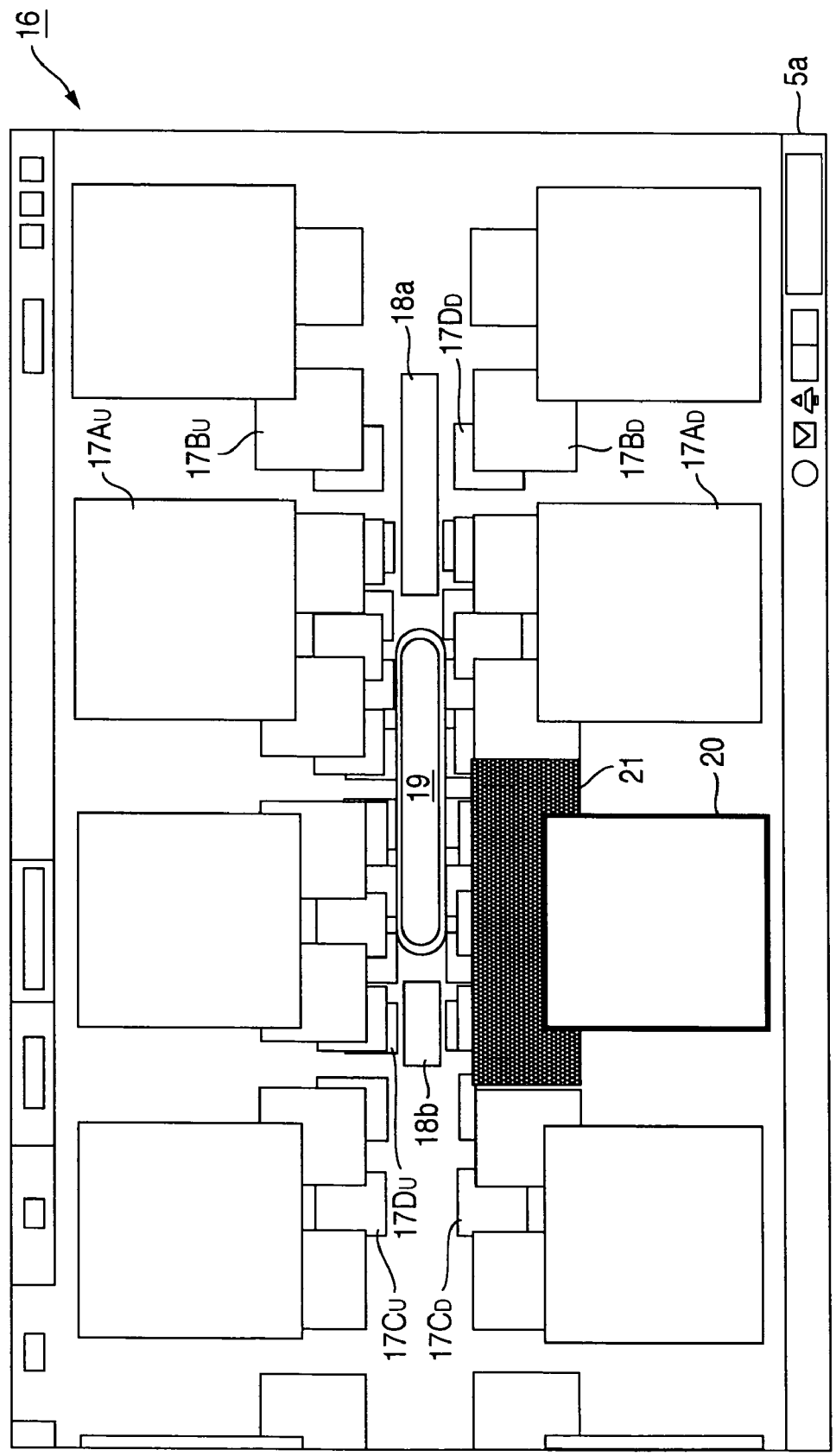
FIG. 5 is a diagram showing another display state different from the thumbnail screens shown in FIGS. 3 and 4.

FIG. 3 to FIG. 5 are diagrams showing an exemplary thumbnail screen displayed on the display screen of the display device 5 shown in FIG. 1, wherein 5a is a display screen, 16 is a thumbnail screen, $17A_U$, $17A_D$, $17B_U$, $17B_D$, $17C_U$, $17C_D$, $17D_U$, and $17D_D$ are thumbnails for each category, 18a and 18b are calendar display parts, 19 is a category name display part, 20 is a focus, and 21 is an attribute information display part.

In FIG. 3, the thumbnail screen 16, which is displayed on the display screen 5a of the display device 5, is three dimensionally displayed in such a way that thumbnails are disposed in the horizontal direction (X-axis direction) of the display screen 5a, and categories are disposed in the depth direction (Z-axis direction). Such thumbnails are read from the file attribute information of the external storage device 3 in FIG. 1, and classified according to the category, with the thumbnails of the same category being disposed in the X-axis direction.

As described above, the category includes "on-the-air program", "unwatched program", "video-recorded program", "picture and still image", "voice", "link collection", "unread e-mail" or the like. These categories, "on-the-air program", "video-recorded program", "picture and still image", "voice", "link collection" and "unread e-mail" are displayed on the thumbnail screen 16 using the thumbnails obtained from the file attribute information.

On the thumbnail screen 16, the thumbnails of the same category are displayed in two rows, the upper and lower sides. Specifically, for a category A, the row of thumbnail $17A_U$ is displayed on the upper side and the row of the thumbnail $17A_D$ is displayed on the lower side. Similarly, for next category B in the Z-axis direction, the row of the thumbnail $17B_U$ is displayed on the upper side and the row of the thumbnail $17B_D$ is displayed on the lower side. For next next category C in the Z-axis direction, the row of the thumbnail $17C_U$ is displayed on the upper side and the row of $17C_D$ is displayed on the lower sides. For a category after the next next one in the Z-axis direction, the row of the thumbnail $17D_U$ is displayed on the upper side and the row of $17D_D$ is displayed on the lower side. Here, it is assumed that thumbnails rows of four categories, A to D, are arranged in the Z-axis direction.

Calendar display parts 18a, 18b are provided between the region where the upper and lower row thumbnails are displayed. Current date and day of the week are displayed on the calendar display part 18a, and current time is displayed on the calendar display part 18b. Likewise, a category name display part 19 is provided between the calendar display parts 18a and 18b, and the name of the category which is displayed on the most front side or the nearest side in the Z-axis direction is displayed on the display part 19. (Here, the category A is displayed on the most front side or the nearest side. The category whose row of thumbnails is displayed on the most front side or the nearest side like this, is referred to as a highest rank layer category hereinafter; the rank of the layer of a category is given such that the rank becomes lower as the category is displayed on the remoter side or the more back side.) Furthermore, a frame shape focus 20 is displayed so as to indicate that any one is currently selected out of the thumbnail of the highest rank layer category located on the upper thumbnail row, the thumbnail of the highest rank layer category located on the lower thumbnail row, and the category display part 19.

It should be noted that the highest rank layer category refers to the category which is actually displayed in the thumbnail screen 16, and as described later, the positional relation in the arrangement of categories in the Z-axis direction may change, and even when the arrangement relation in that direction actually changes, the category whose thumbnails are newly displayed on the most front side, is referred to as the highest rank layer category, and the category whose thumbnails are displayed on the most back side, is referred to as the lowest rank layer category.

In the three-dimensionally displayed thumbnail screen, thumbnails are displayed such that the deeper in the Z-axis direction a category is displayed (i.e., the layer is ranked lower), the smaller the display size of the thumbnails of the category becomes, and part of the thumbnail of a lower rank layer category is displayed as if a viewpoint lies on the center in the X-axis and Y-axis directions of the display screen 5a, thus adding depth to the display.

The thumbnail screen 16 shown in FIG. 3 shows a state in which the focus 20 lies on the category name display part 19 (the state in which the focus 20 lies like this is referred to as have focus hereinafter). When the up direction key 14U of the remote controller 10 shown in FIG. 2 is operated in such a state, the focus 20 moves upwards (i.e. Y-axis direction) and one of the upper side thumbnails $17A_U$ of the highest rank layer category A has focus. An attribute information display part 21 is displayed below the focused thumbnail $17A_U$, and introduction information as the attribute information of a content corresponding to the thumbnail $17A_U$ read from the external storage device 3 is displayed on the attribute information part 21.

In a similar way, when the down direction key 14D of the remote controller 10 shown in FIG. 2 is operated in a stage shown in FIG. 3, the focus 20 moves downward (i.e. Y-axis direction), and one of the thumbnails $17A_D$, located on the lower side of the highest rank layer, has focus as shown in FIG. 5. The attribute information display part 21 is displayed on the upper side of the focused thumbnail 17A$_D$, and introduction information as the attribute information of a content corresponding to the thumbnail 17A$_D$ read from the external storage device 3 is displayed on the attribute information display part 21.

Figure 6:
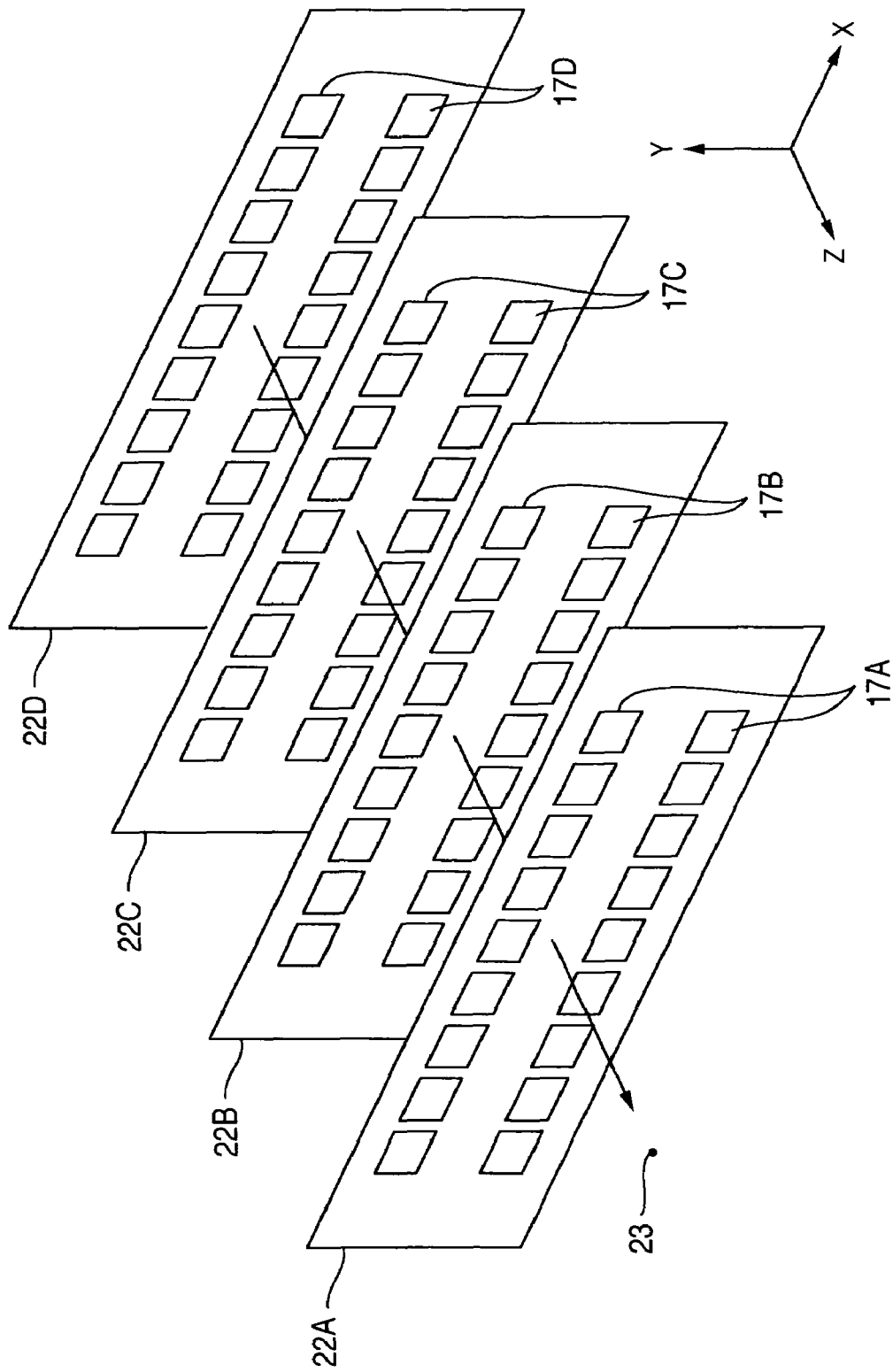
FIG. 6 is a diagram schematically showing the structure of layers constituting the thumbnail screen.

Here, for category A, as shown in FIG. 6, a layer 22A is constituted of two rows of thumbnails 17A of the same size and shape which are neatly arranged on the upper and lower sides. Similarly, for categories B to D, layers 22B to 22D are constituted. The 3D image, which is visible when the layers 22A to 22D, which are evenly spaced in the Z-axis direction, are viewed from a viewpoint 23 towards the back side in the Z-axis direction, is shown in the thumbnail screen 16 shown in FIG. 3 to FIG. 5.

More specifically, as shown in FIG. 7, assuming that when the identically sized layers 22A, 22B, 22C, 22D of each category A, B, C, D, which are equidistantly spaced in the Z-axis direction, are viewed from a viewpoint 23 in front of the layer 22A of the most front side category A (i.e. highest rank layer category), the visual field 24A with respect to the layer 22A includes only part of the layer 22A, then the visual field 24B with respect to the layer 22B is wide enough to include approximately the whole layer 22B, the visual field 24C with respect to the layer 22C is wider compared with the size of the layer 22C, and the visual field 24D with respect to the layer 22D is much wider compared with the size of the layer 22D. When displaying how the layers 22A to 22D look like when viewed from the viewpoint 23 in the Z-axis direction like this on the screen, the visual fields 24A to 24D are displayed in the size shown on the display screen 5a. Therefore, the more distant the layers are from the viewpoint 23, the smaller the layers look, thus display state being as shown in FIG. 3 to FIG. 5.

Returning to FIG. 4, the focus 20 lies on the upper side thumbnail 17A$_U$ of the category A, indicating that the thumbnail 17A$_U$ has focus. The thumbnail 17A$_U$ having focus like this means that the thumbnail 17A$_U$ is specified. In other words, FIG. 4 illustrates that the thumbnail 17A$_U$ of the highest rank layer category A has focus and is specified. Furthermore, the attribute information display part 21 is displayed below the thumbnail 17A$_U$ that represents introduction information such as a title or the like for introducing the content of the thumbnail 17A$_U$.

The focus 20 can be moved up and down. In other words, the focus 20 can be moved in the Y-axis direction. The operation of the up direction key 14U and down direction key 14D of the remote controller 10 (FIG. 2) allows the focus 20 to be raised or lowered. When the down direction key 14D of the remote controller 10 is operated one time in the state shown in FIG. 4 where the thumbnail 17A$_U$ has focus, the focus 20 moves from the thumbnail 17A$_U$ to the category name display part 19 below the thumbnail 17A$_U$, indicating that the category name display part 19 has focus and is specified as shown in FIG. 3. Another operation of the down direction key 14D of the remote controller 10 in the state shown in FIG. 3 moves the focus 20 from the category name display part 19 to the thumbnail 17A$_D$ of the category A below the category name display part 19, indicating that the thumbnail A$_D$ has focus and is specified as shown in FIG. 5. When the thumbnail A$_D$ has focus, the attribute information display part 21 is displayed on the upper side of the thumbnail 17A$_D$. The attribute information display part 21 represents the attribute information, such as a tile or the like, for introducing the content of the thumbnail 17A$_D$.

When the up direction key 14U of the remote controller 10 is operated one time in the state shown in FIG. 5, the focus 20 moves from the thumbnail 17A$_D$ to the category name display part 19 above the thumbnail 17A$_D$, indicating that the category name display part 19 has focus and is specified as shown in FIG. 3. When the up direction key 14U of the remote controller 10 is operated another time, the focus 20 moves from the category name display part 19 to the thumbnail 17A$_U$ of the category A above the category name display part 19, indicating that the thumbnail 17A$_U$ has focus and is specified. Along with this, the attribute information display part 21 is displayed below the thumbnail 17A$_U$.

When the up direction key 14U of the remote controller 10 is operated in the state where the upper thumbnail 17Au has focus as shown in FIG. 4, the focus 20 moves to the lower thumbnail 17A$_D$ as shown in FIG. 5. When the down direction key 14D of the remote controller 10 is operated in the state where the lower thumbnail 17A$_D$ has focus as shown in FIG. 5, the focus 20 moves to the upper thumbnail 17A$_U$ as shown in FIG. 4. In other words, it is possible to move up and down the focus 20 repeatedly and endlessly.

In this way, the focus 20 can be moved up and down every time the up direction key 14U and the down direction key 14D of the remote controller 10 are operated, thus enabling the specification of the upper thumbnail 17A$_U$ or the lower thumbnail 17A$_D$ of the highest rank layer category A as well as giving focus to the category display part 19.

When the decision key 15 shown in FIG. 2 is operated in the state where the thumbnail 17A$_U$ or 17A$_D$ has focus and is specified as described in the foregoing, the selection of the specified thumbnail 17A$_U$ or 17A$_D$ is confirmed. This causes the content corresponding to the selected thumbnail 17A$_U$ or 17A$_D$ to be read from the external storage device 3 (FIG. 1) and to be displayed on the display screen 5a. If the content of the selected thumbnail 17A$_U$ or 17A$_D$ is stored in the library of the external storage device 3 shown in FIG. 1, the content is read from the library and displayed on the display screen 5a. If, for example, the thumbnail 17A$_U$ or 17A$_D$ represents a "recorded program" and the content is recorded moving images, then the moving images are played and displayed on the display screen 5a. Alternatively, if the thumbnail 17A$_U$ or 17A$_D$ represents an "on-the-air program" category and the content is from a TV program now on the air, the content, which is received by the broadcast receiving apparatus 12 shown in FIG. 1, is displayed on the display screen 5a as it is.

It should be noted that the focus 20 lies on a category thumbnail only when it is the highest rank layer, and that it is when the focus 20 is on the thumbnail that the content corresponding to the thumbnail can be selected and displayed.

As described in the following sections, this embodiment features that it is possible to efficiently search a desired high-visibility content out of a large amount of contents with a small operation by automatically scrolling the thumbnails in the X-axis direction when the thumbnails 17 (note that the thumbnails 17A$_U$, 17A$_D$, ..., 17D$_U$, 17D$_D$ are collectively referred to as thumbnails 17) has focus, and by automatically scrolling the thumbnails in the Z-axis direction when the category name display part 19 has focus on such a thumbnail screen 16.

Next, scroll operations in the X-axis and Z-axis directions and a content selection method will be explained taking the acceleration of the scroll operations by the right and-left direction keys, 14R and 14L, of the remote controller 10 as an example.

As shown in FIG. 4 and FIG. 5, when a category thumbnail has focus, it is possible to accelerate the scroll of the row of the thumbnails 17 in the X-axis direction, or in the right or left direction, and to change the scroll direction by operating the right direction key 14R or left direction key 14L of the remote controller 10 shown in FIG. 2. When the scroll in the X-axis direction is performed, the thumbnail which is displayed at the head of the scroll goes out of the display screen 5*a*.

Simultaneously, a new thumbnail emerges on the screen from the opposite direction. At this time, the focus 20 is displayed on the row of the same thumbnails. Therefore, the thumbnail that has focus with the transfer of the focus 20 sequentially changes. In this way, it is possible to search and select the thumbnail of a desired content.

Figure 8A:
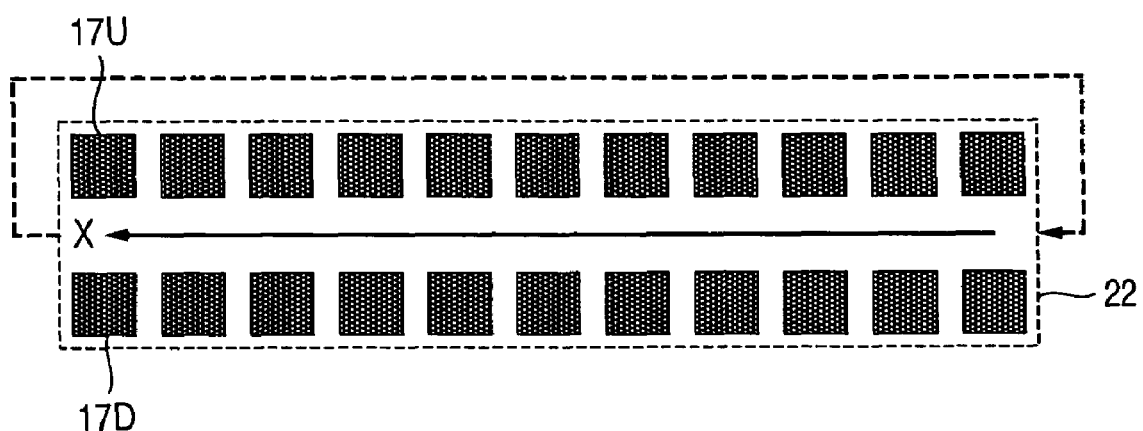
FIGS. 8A and 8B are diagrams explaining the scroll of layers in the X-axis direction on the thumbnail screen.
Figure 8B:
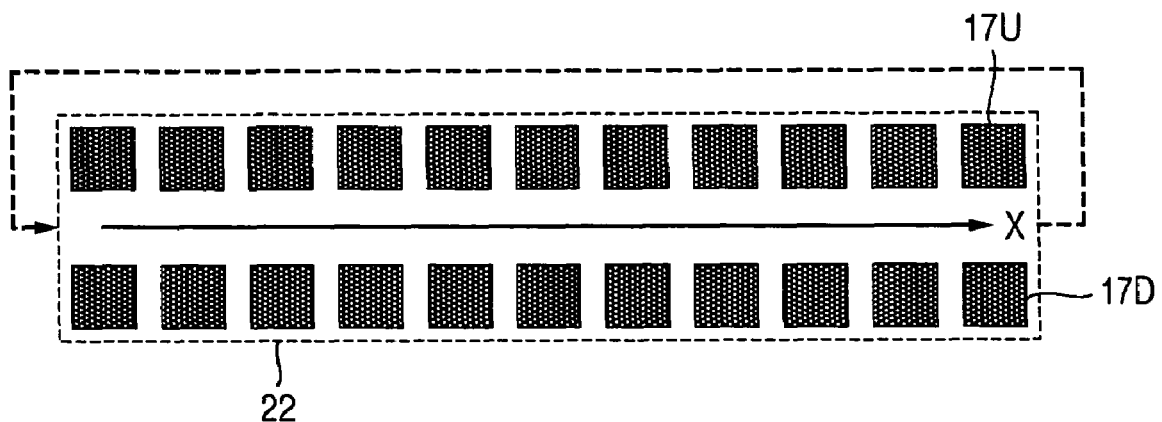

In this case, the thumbnails are conceptually endless. FIG. 8 shows the case where the number of thumbnails displayed is 22. As FIG. 8A shows, when the layer 22 scrolls in the direction indicated by an arrow X, the forefront thumbnails $17_U$, $17_D$ in the screen move to the tail end of the row of the thumbnails 17 as a broken arrow shows. Moreover, as FIG. 8B shows, when the layer 22 scrolls in the direction indicated by an arrow X, the forefront thumbnails $17_U$, $17_D$ in the screen moves to the tail end of the row of the thumbnails 17 as shown by an broken arrow.

FIG. 9A and FIG. 9B show such a scroll in the X-axis direction, and illustrates only the upper half of the display screen 5*a*. Here, the thumbnail of the category A is configured to include A11, A12, A13, A14, . . . , the thumbnail of category B is configured to include B10, B11, B12, B13, B14, B15, . . . , and the thumbnail of category C is configured to include C10, C11, C12, C13, C14, C15, . . . .

FIG. 9A shows a state where the thumbnail A12 is positioned at the center of the display screen 5*a* in the X-axis direction, and the thumbnail 12 has focus. Assuming that the layer, or the row of thumbnails, is now scrolling in the direction indicated by an arrow, the thumbnail 12 moves from the center of the screen until reaching a predetermined distance together with the focus 20. In other words, it moves while having focus. Then, when the thumbnail A12 moves by the predetermined distance from the center of the screen as shown in FIG. 9B, the focus 20 transfers to the thumbnail A13, and the thumbnail A13 has focus as shown in FIG. 9C. Then, when the thumbnail A13 moves by the predetermined distance from the center of the screen, the focus 20 further transfers to the next thumbnail A14.

An exemplary method of controlling the focus transfer will be described below.

The thumbnail 12 or the like has a display coordinate on the display screen. For example, the central part or upper left corner of the thumbnail is set as a representative coordinate. The scroll in the X-axis direction is implemented by adding a transfer amount to such a representative coordinate for each predetermined time to perform thumbnail painting to the representative coordinate. At this time, if such a representative coordinate is included in the display coordinate range corresponding to the predetermined range including the central part of the screen on the display screen, the thumbnail is determined to have focus. If the scroll further advances and, for example, the representative coordinate of the thumbnail A12 is out of the predetermined range of the display coordinate, the thumbnail A12 does not have focus. At this time, since the thumbnail A13 is also scrolling in the same way as the thumbnail A12, the representative coordinate of the thumbnail A13 comes to be included in the predetermined range of the display coordinate, thus the thumbnail A13 having focus. It is possible to sequentially change the thumbnail having focus in conjunction with scroll of the thumbnail in the X-axis direction by adjusting the predetermined range of the display coordinate having focus to the thumbnail display space on the display screen.

Although the foregoing has explained the scroll in the X-axis direction, the scroll in the X-axis direction can also be controlled in the same way. Specifically, when the distance of the representative coordinate of a thumbnail of some category from a viewpoint in the Z-axis direction is within a predetermined range, it can be considered that any one of the thumbnails included in the category has focus. Moreover, as described in detail in the following sections, the thumbnail having focus may be the one that is included in the highest rank layer.

In this way, the thumbnails scroll in the X-axis direction, and when each thumbnail lies in a predetermined range including the central part of the screen in the X-axis direction, the focus 20 lies on the thumbnail, and the thumbnail has focus. This causes each thumbnail to sequentially have focus along with the advancement of scroll.

In the X-axis direction scroll, the thumbnail that lies off the left side of the display screen 5*a* and is not displayed in the screen (thumbnail A11 in FIG. 9) moves to the tail end of the thumbnail row, as explained in FIG. 7. If the scroll is kept on, the thumbnail emerges again from the right side of the display screen 5*a*, thus thumbnails being displayed endlessly.

It should be noted that the scroll in the X-axis direction shown in FIG. 9 is in the case where the left direction key 14L of the remote controller shown in FIG. 2 is operated, and it goes without saying that when the right direction key 14R is operated, the thumbnail row scrolls in the direction opposite to that shown in FIG. 9.

Furthermore, the attribute information display part 21 is displayed associated with the thumbnail having focus with the arrival of focus 20, thus information introducing the content corresponding to the focused thumbnail being displayed. Therefore, when the thumbnail having focus transfers from the thumbnail A12 to the thumbnail A13, the introduction information displayed in the attribute information display part 21 changes from the content introduction information corresponding to the thumbnail A12 to the display of the content corresponding to the thumbnail A13.

In this way, the row of the thumbnails scrolling in the X-axis direction is displayed repeatedly.

In a layer except the highest rank layer, the thumbnail locating at the end of the display screen in the X-axis direction fades out, with its color gradually turning to the background color, or fades in, with the thumbnail gradually emerging from the background color along with the scroll in the X-axis direction. This is implemented by changing the light transmittance of a figure called a mask. The mask has the same color as the background and has the same size as the thumbnail, and is piled up in front of the thumbnail locating at the end of the display screen.

Figure 10:
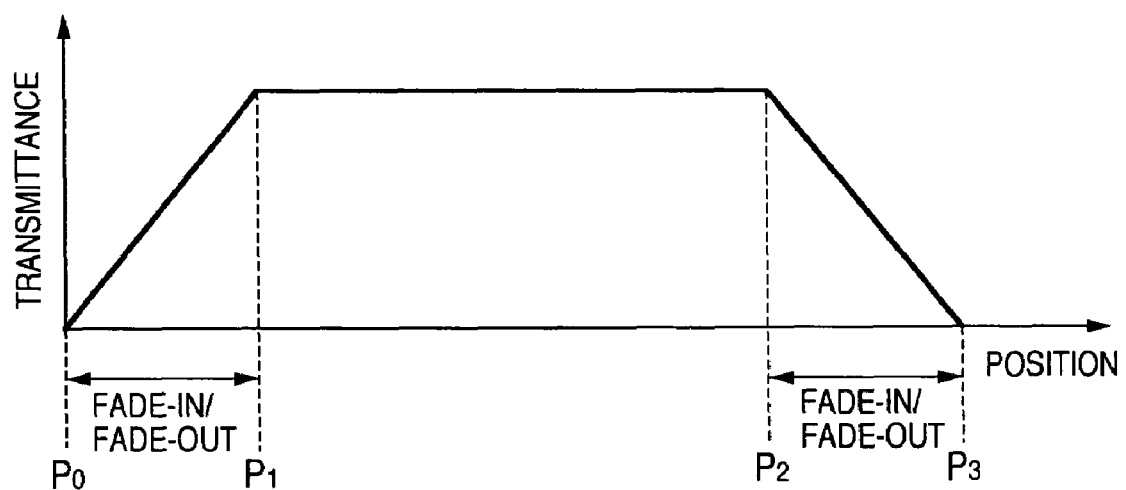
FIG. 10 is a diagram showing a change in brightness of thumbnails during the scroll of the thumbnail screen.

FIG. 10 shows changes in the light transmittance of the mask of the thumbnail 17 scrolling in the X-axis direction, wherein the horizontal axis shows the position in the X-axis direction, and the vertical axis shows the light transmittance of the mask of the thumbnail 17. Additionally, in FIG. 10, the position $P_0$ is the place where the left side of the display screen 5*a* is located, $P_1$ is a position away from the position $P_0$ by a predetermined distance (e.g. one fourth of the width of the thumbnail 17), $P_3$ is the place where the right side of the display screen 5*a* is located, and $P_2$ is the position away from the position $P_3$ by a predetermined distance (e.g. a fourth of the width of the thumbnail 17). However, the positions $P_1$, $P_2$ are not restricted to these.

In FIG. 10, taking the thumbnail C10 in FIG. 9 as an example, the thumbnail C10 is scrolling in the left direction shown by an arrow X. If even part of the thumbnail C10 lies on the region between the positions $P_1$ and $P_2$, the thumbnail C10 is displayed with constant transmittance. When the thumbnail C10 moves towards the left and its left side passes the position $P_1$ (i.e. the thumbnail C10 starts to lie outside the region between the positions $P_1$ and $P_2$), the transmittance of the mask starts to decline (i.e. starts to turn to the background color), and the transmittance of the mask gradually declines as the thumbnail further scrolls. Then, when the right side of the thumbnail C10 reaches the position $P_0$, the transmittance of the mask turns to 0. In this manner, the thumbnail C10 fades out and lies off the left side of the display screen 5a.

Simultaneously with the above, a new thumbnail (thumbnail C15) emerges from the right side of the display screen 5a. After the thumbnail C15, starting from the left side thereof, emerges from the position $P_3$, the transmittance of the mask of the thumbnail C15 gradually increases until the left side of the thumbnail C15 reaches the position $P_2$. After the left side of the thumbnail C15 passes the position $P_2$, the transmittance of the mask of the thumbnail C15 becomes constant. In this manner, the new thumbnail C15 emerges from the right side of the display screen 5a while fading in.

The same is true of the case where the thumbnail scrolls in the direction opposite to the above. After the left side of thumbnail, which has so far been displayed, passes the position $P_2$, it goes off the display screen 5a while fading out. With this, a new thumbnail emerges from the left side of the display screen 5a while fading in.

The way described above gives a sense of great depth since the row of the thumbnails for displaying the categories (categories B, C, D), which are not on the most front side, is faded in or faded out at both ends of the row, and thereby the number of the thumbnails is kept constant.

It is possible to accelerate the scroll of the thumbnail screen 16 in the Z-axis direction and to change the direction of the scroll by operating the right direction key 14R or left direction key 14L shown FIG. 2 in the state where the category display part 19 shown in FIG. 3 has focus.

Figure 11A:
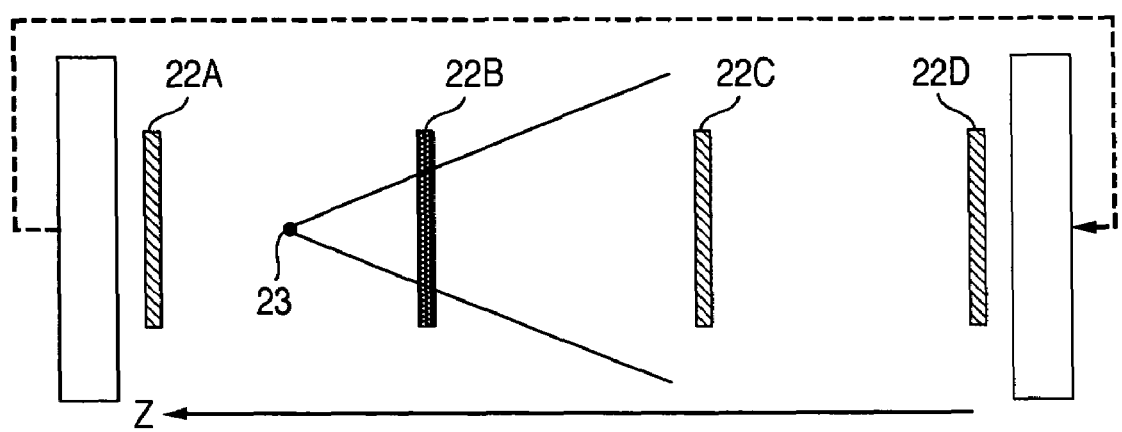
FIGS. 11A and 11B are diagrams explaining the scroll of the row of category layers in the Z-axis direction on the thumbnail screen.
Figure 11B:
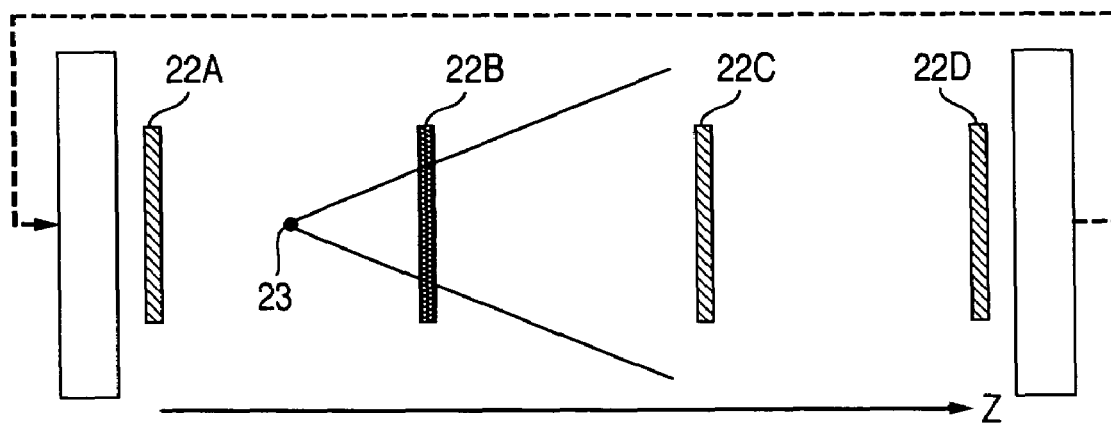

FIGS. 11A and 11B are diagrams illustrating the scroll in Z-axis direction when the number of categories is 4.

When the Z-axis direction scroll is accelerated by the operation of the right direction key 14R of the remote controller 10 in the sate shown in FIG. 3, the layer 22A which has come to lie on a more front side than the viewpoint 23 is disposed behind the layer 22D of category D, which has so far been the lowest rank layer, as shown by a broken arrow, with the next layer 22B of category B becoming the highest rank layer thumbnail as shown in the FIG. 11A. As long as the right direction key 14R is operated, the accelerated scroll in the Z-axis direction continues, displaying each category endlessly. Upon release of a hand from the right direction key 14R, the scroll from the depth to the front side is decelerated.

The same is true of the case where the left direction key 14L of the remote controller 10 is operated in the state shown in FIG. 3. As FIG. 9B shows, the accelerated scroll in the Z-axis direction opposite to the above is performed and the layer 22A of the lowest rank layer category A is disposed before the layer 22B of category B, which has so far been the highest rank layer category, to become the highest rank layer as the broken arrow shows, with each category being displayed endlessly. Upon release of a hand from the left direction key 14L, the scroll from the front side to the depth is decelerated.

Figure 12A:
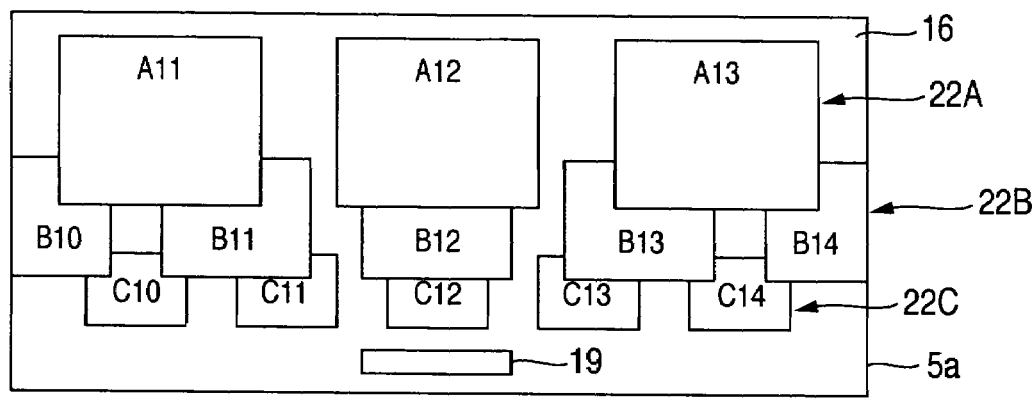
FIGS. 12A, 12B, and 12C are diagrams showing the scroll of the thumbnail screen in the Z-axis direction.
Figure 12B:
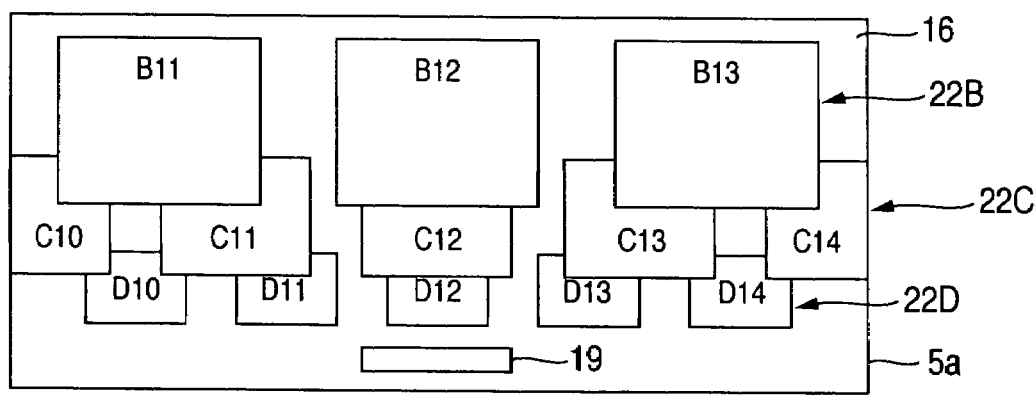
Figure 12C:
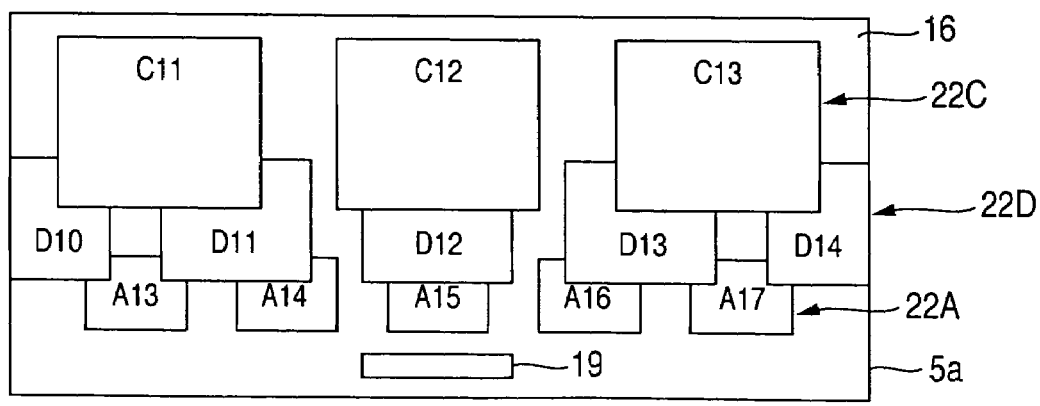

FIGS. 12A, 12B, and 12C are diagrams showing the scroll in the Z-axis direction in the thumbnail screen 16 and show upper half of the display screen 5a.

FIG. 12A shows the same state as that shown in FIG. 3, wherein category A is the highest rank layer category.

When the right direction key 14R of the remote controller 10 shown in FIG. 2 is operated in such a state, the thumbnail screen 16, thereby the arrangement of the layers 22A, 22B, and 22C of each category A, B, and C, does not scroll in the X-axis direction, but scrolls towards the front side along the Z-axis direction (this is referred to as scroll in the Z-axis direction), and these layer 22A, 22B, and 22C come nearer. In this case, the viewpoint 23 (FIG. 11) lies in the center of the display screen 5a as described above. Therefore, the layers 22A, 22B, and 22C of each category disposed on the uppers side are displayed to move upward while moving towards the front side. Furthermore, layers 22A, 22B, and 22C of each category, which are not shown in the figures, disposed on the lower side are displayed to move downward while moving towards the front side.

Then, when the layer 22A of category A lies at the front side of the viewpoint 23 to cease to be displayed on the screen as the FIG. 12B shows, next category B becomes the highest rank layer category. Furthermore, the category name to be displayed in the category display part 19 changes to the new highest rank layer category B along with the change of the highest rank layer category. With this, the new layer 22D of category D is additionally displayed as a layer of the lowest rank layer category at a position most distant from the viewpoint in the Z-axis direction. At this time, as explained in FIG. 11, the layer 22A of category A is disposed behind (at the back of) the layer 22D. At this time, it is shifted by three pieces of thumbnail in the X-direction so as to display the whole thumbnail of the category.

When the right direction key 14R of the remote controller 10 shown in FIG. 2 is further operated, the scroll in the Z-axis direction continues, and the layer 22B of category B lies at the front side of the viewpoint 23 to cease to be displayed. In stead, next category C becomes the highest rank layer category, with the layer 22C being displayed at the most front side. With this, a layer 22A of category A as a new category is additionally displayed as the lowest rank layer category at a position most distant from the viewpoint in the Z-axis direction When the left direction key 14L of the remote controller shown in FIG. 2 is operated, each category inversely scrolls from the front side towards the back in the Z-axis direction. A new category emerges from the front side to become the highest rank layer category, and the lowest rank layer category ceases to be displayed.

In this manner, as long as the right direction key 14R or the left direction key 14L of the remote controller shown in FIG. 2 is operated, such a scroll in the Z-axis direction continues, and the highest rank layer category changes.

In this way, it is possible to select a desired category quickly by operating the right direction key 14R or the left direction key 14L of the remote controller to accelerate the scroll in the Z-axis direction. Moreover, it is possible to confirm whether the desired category has been selected from the content displayed in the category name display part 19, where the name of the highest rank layer category, of which thumbnail is displayed on the most front side, is displayed.

It should be noted that also in the case of such a scroll in the Z-axis direction, as is the case with the scroll in the X-axis direction, the thumbnail 17 of a layer 22 fades out when the layer 22 goes out from the thumbnail screen 16 in the Z-axis direction, and the thumbnail 17 fades in when the layer of a new category comes into the thumbnail screen 16.

Both in the X-axis direction scroll and Z-axis direction scroll, the scroll is suspended for a certain time (e.g. for one or two seconds) every time the focus transfers in order to facilitate the identification of the category and thumbnail.

Moreover, in order to display the whole thumbnail of the whole category, when there is no operation by the remote controller in a state, where the thumbnail screen 16 is displayed, even after a predetermined time $T_0$ elapses, the screen changes over to a state where the X-axis direction scroll and Z-axis direction scroll are repeated alternately every time a predetermined time, which is determined by random numbers, elapses.

In the above state where the X-axis direction scroll and Z-axis direction scroll are alternately repeated, the automatic scroll in both the X-axis direction and Z-axis direction are predetermined one-direction scrolls.

Furthermore, the category name display part 19 (FIG. 12) is a fixed layer, and is located at a fixed position. Therefore, even if the layer 22 scrolls in the Z-axis direction, the category name display part 19 remains to be displayed at a given location.

Figure 13:
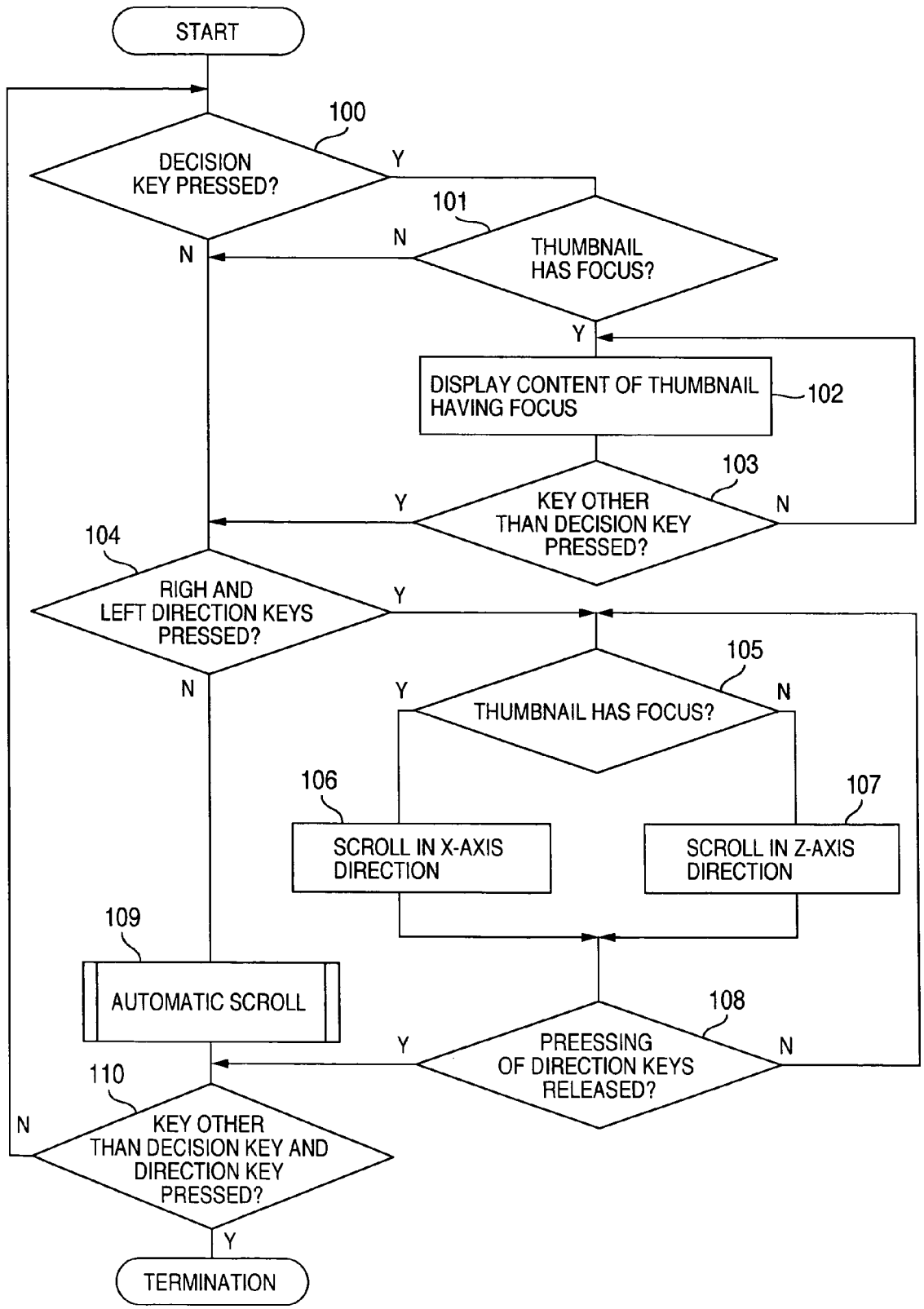
FIG. 13 is a flow chart illustrating an exemplary operation of the embodiment shown in FIG. 1.
Figure 14:
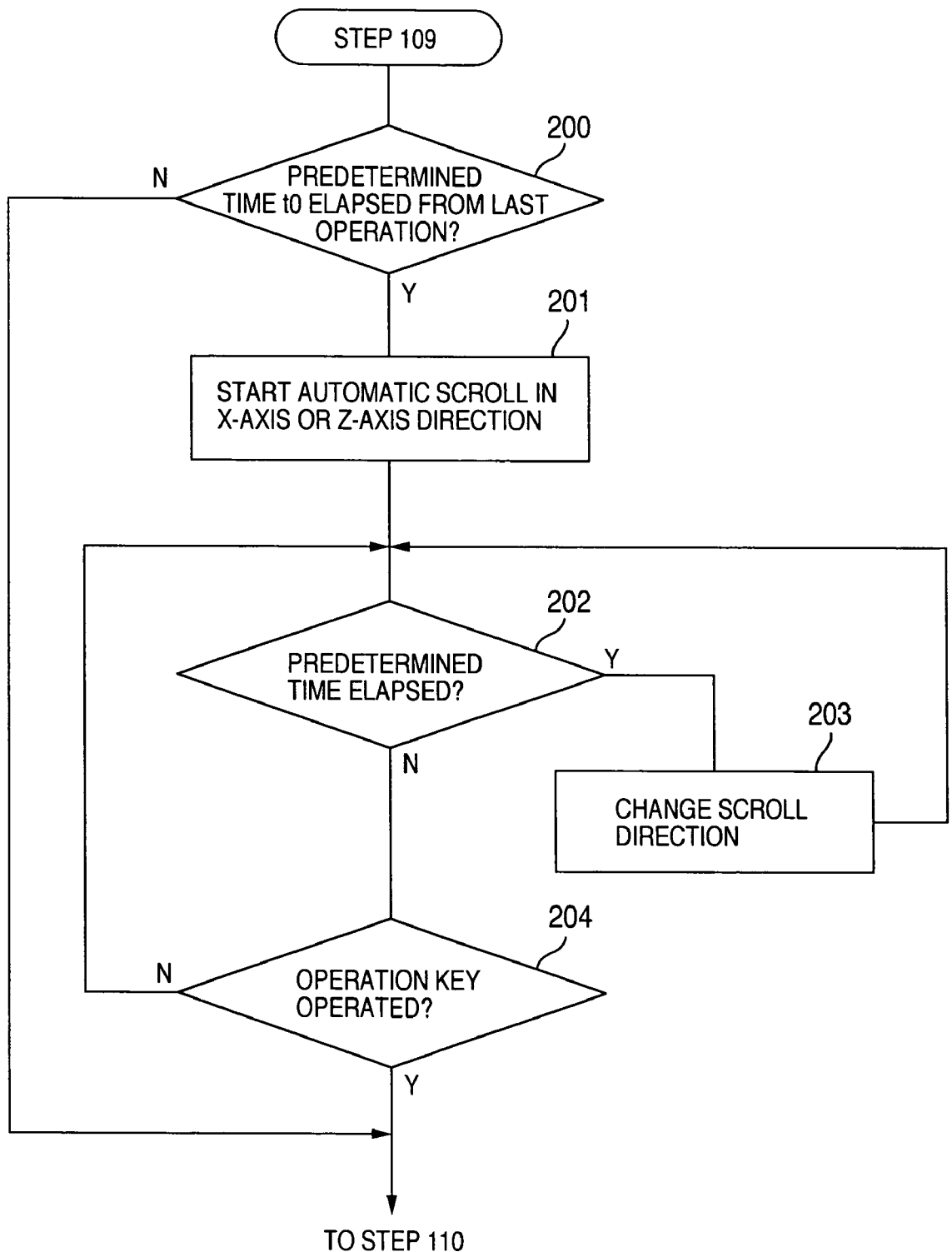
FIG. 14 is a flow chart showing a specific example of a step 109 in FIG. 13.

The above switchover from the thumbnail screen 16 to the content display screen as well as the scroll operations in the X-axis and Y-axis directions are performed in response to the command information from the remote controller 10 under the control of the system processor (FIG. 1), and its flowchart is given in FIGS. 13 and 14.

In FIG. 13, if no keys are operated including the decision key 15, right and left direction keys 14R, 14L, and others, of the remote controller 10 shown in FIG. 2 in a state where any one of the thumbnail screens 16 shown in FIG. 3 to FIG. 5 is displayed, a series of steps 100, 104, 109, 110 and 100 in that order are repeated, with the same thumbnails screen 16 remaining to be displayed. Still more, even if the decision key 15 of the remote controller 10 is operated in the state where the thumbnail screen 16 is displayed, in which the focus 20 lies on the category name display part 19, only a series of steps 100, 101 and 100 in that order are implemented, and then the flow returns to the implementation of the series of steps 100, 104, 109, 110 and 100 in that order, thus the thumbnail screen 16 remaining to be displayed.

Now, if the decision key 15 of the remote controller 10 is operated (step 100) in the state where the thumbnail screen 16, shown in FIG. 4 or FIG. 5, is displayed, the focus 20 lies on the thumbnail $17A_U$ or $17A_D$ (step 101). Therefore, the content of the thumbnail $17A_U$ or $17A_D$, on which the focus 20 lies, is displayed (step 102). The content remains to be displayed until the operation of a key other than the decision key 15 (step 103).

If the operation key other than the decision key 15 is operated while the content is displayed, the screen returns to the original thumbnail screen 16, which is, in this case, a state where the thumbnail screen 16 shown in FIG. 4 or FIG. 5 is displayed, and the flow returns to a standby state where the series of steps 100, 104, 109, 110 and 100 in that order are implemented.

Next, if the right direction key 14R or left direction key 14L of the remote controller 10 is operated (step 104) in the state where the thumbnail screen 16 shown in FIG. 4 or FIG. 5 is displayed, the focus 20 lies on the thumbnail $17A_U$ or $17A_D$, or on the row of the thumbnail 17 (step 105). Therefore, the row of the thumbnail 17 scrolls in the X-axis direction (step 106) as described above. This scroll in the X-axis direction continues as long as the right direction key 14R or the left direction key 14L is operated.

Still more, if the right direction key 14R or left direction key 14L of the remote controller 10 is operated (step 104) in the state where the thumbnail screen 16 shown in FIG. 3 is displayed, the row of thumbnails 17 of each layer, or the row of the layers, scrolls in the Z-axis direction (step 107) as described above, since the focus 20 lies on the category name display part 19 (step 105). This Z-axis direction scroll continues as long as the right direction key 14R or left direction key 14L is operated (i.e. until pressing operation of those direction keys is released) (step 108).

If the operation of the right direction key 14R or left direction key 14L of the remote controller 10 is suspended (step 108) during the above-mentioned scrolling operation in the X-axis or Z-axis direction, such scroll operations are suspended, and the screen returns to the state where the thumbnail screen 16 is displayed and thumbnails are at rest, and the flow returns to the standby state where the series of steps 110, 100, 104, 109 and 110 in that order are implemented.

As described above, if the operation keys are not operated even after a predetermined time $t_0$ elapses, the flow enters a mode of automatic scroll (step 109). This will be explained below with reference to FIG. 14.

In FIG. 14, when the predetermined time $t_0$ elapses (step 200) after the last key operation by a user, an automatic scroll in the X-axis direction or Z-axis direction starts (step 201). Then, after the predetermined time, which is determined by random numbers, elapses (step 202), the scroll direction of the automatic scroll is changed to the X-axis direction or to the Z-axis direction (step 203). This operation is performed repeatedly as long as an operation key other than the right direction key 14R or left direction key 14L is not operated (step 204).

If an operation key other than the right direction key 14R or left direction key 14L is operated (step 204) during the above automatic scroll, the flow advances to the step 110 in FIG. 13, then returning to the standby state where a series of steps 110, 100, 104, 109 and 110 in that order are implemented.

It should be noted that even if the up direction key 14U, or the down direction key 14D in the remote controller 10 is operated while the content is displayed, the display state remain unchanged. If an operation key other than the decision key 15 and each direction key, 14U, 14D, 14R 14L, of the remote controller 10 is operated (step 109) while the thumbnail screen 16 is displayed, the display mode of the thumbnail screen 16 terminates.

As described in the foregoing, the operation of the up direction key 14U, down direction 14D, right direction 14R, and left direction key 14L allows the thumbnail screen 16 to be scrolled in the Z-axis direction and X-axis direction, and the thumbnail of the desired category to have focus. The operation of the decision key 15 allows the content corresponding to the thumbnail having focus to be displayed on the screen. Just the operation of those operation keys allows a wide variety of contents to be searched and obtained, thus ensuring easy access to information.

Moreover, in this embodiment, thumbnails of various categories are configured to be searched even if so many thumbnails, which are simultaneously displayed on the thumbnail screen 16, are not displayed on each of the two rows, upper and lower. Therefore, the thumbnails can be displayed in relatively large size, thus enabling the user to identify the contents from the thumbnail and to obtain desired contents easily without fail.

It should be noted that, although the foregoing description has been provided to illustrate the operation by operation keys shown in FIG. 2, similar operation keys provided on a keyboard 9 (FIG. 1) can also be used to ensure similar information access.

Additionally, although the foregoing has described the selection of a desired thumbnail by scrolling the thumbnail screen 16, a mouse 8 (FIG. 8) can also be used for the operation of the thumbnail screen 16 in this embodiment. This will be described in the following sections.

The mouse operation is to point a given position on the thumbnail screen 16 by the mouse cursor and click there. The pointing operation by the mouse cursor includes an operation to point an arbitrary category thumbnail on the thumbnail screen 16, an operation to point the category name display part 19, and an operation to point a part other than those.

When the arbitrary category thumbnail is pointed by the mouse cursor on the thumbnail screen 16, it becomes the highest rank layer category.

Figure 15A:
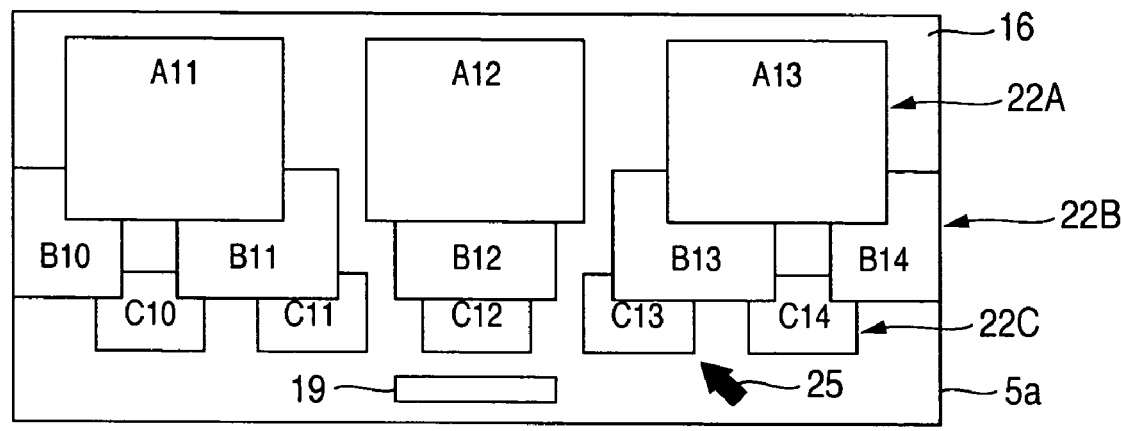
FIGS. 15A and 15B are diagrams showing the scroll in the Z-axis direction by mouse operations.
Figure 15B:
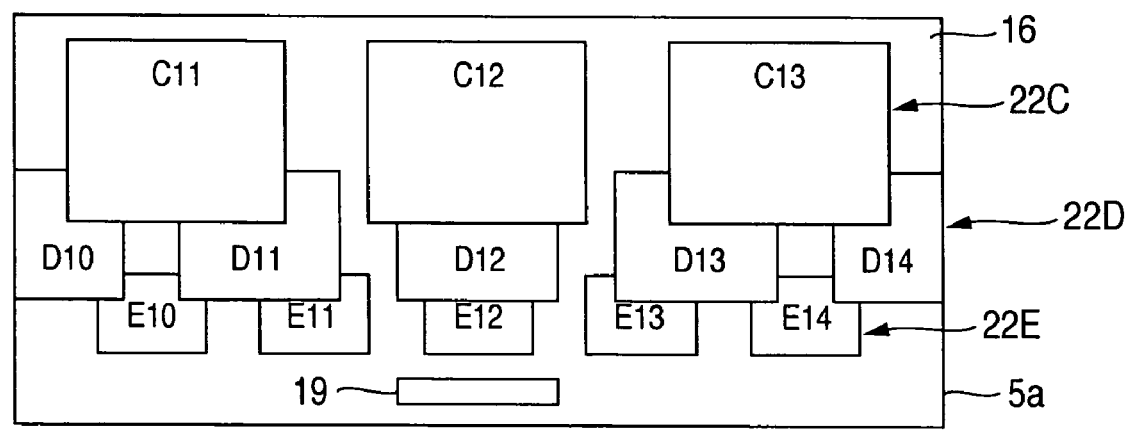

FIG. 15A shows the thumbnail screen 16 in which the layer 22 of category A is the highest rank layer (however, just the upper half of the thumbnail screen 16 is shown there). When the mouse 8 is operated to point, for example, the thumbnail 17 of category C by the mouse cursor 25, and to click there, the thumbnail of category C moves in the Z-axis direction and lies at the most front side to become the highest rank layer as the FIG. 15B shows.

This enables the display of the layer of the desired category, which can be identified on the thumbnail screen 16, on the most front side, and the focus 20 lies on the highest rank layer, as previously described in FIG. 9, thus making it possible to rapidly obtain (access) the desired thumbnail 17, thereby the desired content.

It is possible to accelerate the Z-axis direction scroll by clicking a part other than the thumbnail after pointing the category name display part 19 and turning the thumbnail screen into a Z-axis direction scroll state on the thumbnail screen 16 shown in FIG. 15A. Furthermore, when part of the thumbnail is clicked, the clicked category moves to the highest rank layer and scrolls in the X-axis direction. If the thumbnail in the highest rank layer is clicked in the X-axis direction scroll state, the content corresponding to the thumbnail is displayed. If the category name display part 19 is clicked, the scroll changes to the Z-axis direction scroll. If a category thumbnail on a layer other than the highest rank layer, the clicked category thumbnail moves to the highest rank layer and scrolls in the X-axis direction. If a location other than those is clicked, the X-axis direction scroll is accelerated.

The operation of the mouse 8 in this manner also enables the thumbnail screen 16 to be scrolled in the Z-axis direction as well as X-axis direction, and enables a desired category layer 22 to become the highest rank layer while still keeping the focus 20 positioned on the arrangement of the thumbnail 17 as shown in FIGS. 4 and 5. When the desired category layer 22 becomes the highest rank layer, it becomes possible to search the desired thumbnail 17 immediately by operating the right direction key 14R or left direction key 14L of the remote controller 10 shown in FIG. 2, thus making it possible to access the desired content rapidly.

In this embodiment, the category that can be used includes: "on-the-air program", "unwatched program", "recorded program", "picture and still image", "voice", "link collection", "unread e-mail" or the like, and other categories can also be added to them, and the existing categories can be divided into a plurality of categories as required.

In addition, when the "on-the-air program" category is the highest rank layer category, a still video image of the program screen at that point of time can be displayed as a TV program thumbnail for every predetermined interval (e.g. seconds or the like). Therefore, for example, every time the thumbnail is displayed, the content of the still video image on the thumbnail changes. Furthermore, when the focus 20 lies on the thumbnail of the TV program, the content of the broadcast received at the point of time may be displayed in moving images.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An apparatus with thumbnail display for displaying thumbnail information of a content to select the content, comprising:

storage means for storing the content, thumbnail information representing the outline of said content, and category information for classifying said content;

3D display means for disposing said content thumbnail information in an X-axis or a Y-axis direction, which is a surface direction, for each category information to display them in layers, and for disposing a plurality of said layers in a Z-axis direction, which is a depth direction, to three-dimensionally display them after changing the display size of the thumbnail information depending on the layer such that the size is larger for a more front side in the Z-axis direction; and operation means for controlling the display layer of the thumbnail information by said 3d display means, and for selecting the content to be viewed or accessed by the apparatus with thumbnail display, wherein said 3D display means includes a category name display means for displaying the category name of the content of the thumbnail information disposed on the most front side layer in the Z-axis direction, wherein said 3D display means scroll-displays the thumbnail information in any of the X-axis direction or Y-axis direction, scroll-displays the thumbnail information in one direction of the Z-axis direction in units of a layer, and changes the category name display in conjunction with the scroll in the Z-axis direction, and wherein said 3D display means displays a predetermined number of thumbnails less than the number of the contents included in the category, wherein thumbnails are scroll-displayed in either the X-axis direction or Y-axis direction so that all of the contents included in the category are thumbnail displayed.

2. The apparatus with thumbnail display according to claim 1, wherein said 3D display means disposes the thumbnail information in two rows in the X-axis direction for each layer, displays the layer, which is located at the more front side in the Z-axis direction, at the more distant position in the Y-axis direction, and displays the category name between said two rows of thumbnail information.

3. The apparatus with thumbnail display according to claim 1, wherein said operation means scroll-displays the thumbnail information, which is displayed at the most front side layer in the Z-axis direction and at a predetermined region in the X-axis direction or Y-axis direction, in any of the X-axis direction and Y-axis direction when it has focus, and scrolls the thumbnail information in a layer unit in one direction of the z-axis direction when said category name display has focus.

4. The apparatus with thumbnail display according to claim 1, wherein said content thumbnail information includes broadcast video information received by a broadcast receiving apparatus, and said 3D display means displays the broadcast video information in real time on any one of the plurality of thumbnail information.

5. An apparatus with thumbnail display for displaying thumbnail information associated with a content, comprising:

display means for displaying a thumbnail screen in which layers, one for a category, for indicating the kind of category are disposed in the Z-axis direction, which is the depth direction, thumbnails are disposed in the X-axis direction, which is the horizontal direction, for each of said layer, in a predetermined number less than the number of contents included in the category associated with the layer, wherein by conducting scrolling the screen in X-axis direction, all of the thumbnails included in the category are thumbnail displayed, and the thumbnails are displayed with the display size of the thumbnail information being changed depending on the layer such that the size is larger for a more front side layer in the Z-axis direction, said display means includes a category name display part for displaying category names of the content of the thumbnail information disposed on the most front side layer in the Z-axis direction;

first operation means for selectively giving focus to any of a thumbnail located on a particular position on the layer of a highest rank layer category and said category name display part;

second operation means for scrolling said layers disposed in the Z-axis direction in the Z-axis direction;

third operation means for scrolling said thumbnails disposed on said layers in the X-axis direction in the X-axis direction; and fourth operation means for displaying the content corresponding to said thumbnail having focus on said display screen, wherein said apparatus with thumbnail display enables the Z-axis direction scroll to select a category and the X-axis direction scroll to select a desired thumbnail of said category.

6. The apparatus with thumbnail display according to claim 5, further comprising:

means for scrolling said layers disposed in the Z-axis direction, and scrolling said thumbnails disposed on said layer in the Z-axis direction alternately and automatically in a predetermined cycle when neither the Z-axis direction scroll nor the X-axis direction scroll is performed by said second and third operation means until the elapse of a predetermined time.

7. The apparatus with thumbnail display according to claim 6, wherein said X-axis direction automatic scroll and said Z-axis direction automatic scroll suspend the scrolls for a predetermined time period in a predetermined cycle.

8. The apparatus with thumbnail display according to claim 6, wherein said X-axis direction automatic scroll and said Z-axis direction automatic scroll change scrolling speed when said second and third means are operated.

9. The apparatus with thumbnail display according to claim 5, wherein said second operation means enables the scroll of said layers disposed in the Z-axis direction when said category name display part has focus.

10. The apparatus with thumbnail display according to claim 5, wherein said category name display means displays the name of said highest rank layer category, and when the highest rank layer category is changed by the Z-axis direction scroll of said arrangement of layers, the category name displayed on said category name display part changeovers to the name of the category which has newly become the highest rank layer.

11. The apparatus with thumbnail display according to claim 5, wherein said third operation means enables at least the arrangement of the thumbnails on the layer of highest rank layer category to be scrolled in the X-axis direction when the thumbnail on said highest category layer has focus.

12. The apparatus with thumbnail display according to claim 5, wherein said layers of each category are disposed such that they are displayed endlessly, and during the scroll in the X-axis direction, they can be sequentially and repeatedly displayed.

13. The apparatus with thumbnail display according to claim 5, wherein during the scrolls in said X-axis direction and in said Z-axis direction, a thumbnail, which is put out from said thumbnail screen, is put out while fading out, and a thumbnail, which newly emerges on said thumbnail screen, emerges while fading in.

14. The apparatus with thumbnail display according to claim 5, wherein one of said categories is an "on-the-air program" which is a TV program now on the air, and the received content is displayed instead of said thumbnail on the thumbnail display region where said category, "on-the-air program," has focus.

15. The apparatus with thumbnail display according to claim 5, wherein one of said categories is an "on-the-air program" which is a TV program now on the air, and the content of said "on-the-air program" category thumbnail is changed to that received at that point of time for each point of time of predetermined time interval.

16. The apparatus with thumbnail display according to claim 5, further comprising:

fifth means for turning a selected layer into the layer of the highest rank layer category by selecting an arbitrary layer out of said row of layers of each category disposed in the Z-axis direction.

17. The apparatus with thumbnail display according to claim 16, wherein said fifth means scrolls said row of layers in the Z-axis direction by selecting a region other than said layer on said thumbnail screen.

18. A thumbnail displaying method for an apparatus with a thumbnail display for displaying thumbnail information of a content to select the content, comprising the steps of:

storing the content, thumbnail information for representing the outline of said content, and category information of said content;

selecting, for each of said category information, thumbnail information about a predetermined number of contents less than the number of contents included in the category;

disposing the selected thumbnail information in the X-axis or Y-axis direction, which is a surface direction, for each category information to display them in layers, and disposing a plurality of layers in the Z-axis direction, which is a depth direction, to three-dimensionally display them after changing the display size of the thumbnail information depending on the layer such that the size is larger for a more front side layer in the Z-axis direction;

scroll-displaying the thumbnail information disposed in the most front layer in the Z-axis direction in any of the X-axis and Y-axis directions;

scroll-displaying the thumbnail information in one direction of the Z-axis direction in units of a layer; and displaying a category name of the content of the thumbnail information disposed on the most front side layer in the Z-axis direction.

* * * * *